US011734898B2

(12) United States Patent
Yanagisawa

(10) Patent No.: US 11,734,898 B2
(45) Date of Patent: Aug. 22, 2023

(54) PROGRAM, INFORMATION PROCESSING METHOD, AND INFORMATION PROCESSING TERMINAL

(71) Applicant: MERCARI, INC., Tokyo (JP)

(72) Inventor: Satoshi Yanagisawa, Tokyo (JP)

(73) Assignee: MERCARI, INC., Tokyo (JP)

( * ) Notice: Subject to any disclaimer, the term of this patent is extended or adjusted under 35 U.S.C. 154(b) by 0 days.

(21) Appl. No.: 17/381,019

(22) Filed: Jul. 20, 2021

(65) Prior Publication Data

US 2021/0350628 A1 Nov. 11, 2021

Related U.S. Application Data

(63) Continuation of application No. PCT/JP2019/005615, filed on Feb. 15, 2019.

(30) Foreign Application Priority Data

Jan. 28, 2019 (JP) .................................. 2019-012358

(51) Int. Cl.
G06T 19/00 (2011.01)
G06V 20/20 (2022.01)

(52) U.S. Cl.
CPC ............ *G06T 19/006* (2013.01); *G06V 20/20* (2022.01)

(58) Field of Classification Search
CPC ....... G06T 19/00; G06T 19/006; G06V 20/20; G06V 20/647; G06Q 30/0639; G06Q 30/0643
See application file for complete search history.

(56) References Cited

U.S. PATENT DOCUMENTS 8,924,261 B2 * 12/2014 Stinchcomb ....... G06Q 30/0643
705/26.1
11,106,915 B1 * 8/2021 Nagar ..................... G06F 16/29
(Continued)

FOREIGN PATENT DOCUMENTS

CN 107492022 A * 12/2017
CN 113711165 A * 11/2021 ......... G02B 27/0172
(Continued)

OTHER PUBLICATIONS

Machine English translation of JPH081-90640A, Jul. 23, 1996, 18 pgs.
(Continued)

*Primary Examiner* — Chante E Harrison
(74) *Attorney, Agent, or Firm* — Morgan, Lewis & Bockius LLP

(57) ABSTRACT

There is provided a program for causing an information processing terminal to execute a step of acquiring position information indicating a position of the information processing terminal, a step of transmitting the position information to an information processing apparatus, a step of receiving display data related to one or more products which is associated with the position information from the information processing apparatus, a step of acquiring a first region which satisfies a predetermined condition related to safety of a user, the first region being a region in an image taken by an image pickup unit, and a step of outputting the display data related to the one or more products to the acquired first region in a real space corresponding to the image or the image.

20 Claims, 16 Drawing Sheets

(56) References Cited

U.S. PATENT DOCUMENTS

| | | | |
|---|---|---|---|
| 2013/0093788 A1* | 4/2013 | Liu | G02B 27/017 |
| | | | 345/633 |
| 2013/0106910 A1 | 5/2013 | Sacco | |
| 2013/0293582 A1* | 11/2013 | Ng-Thow-Hing | G01C 21/365 |
| | | | 345/633 |
| 2014/0208272 A1* | 7/2014 | Vats | G06F 3/011 |
| | | | 715/852 |
| 2015/0161762 A1 | 6/2015 | Fujiwara | |
| 2016/0109954 A1* | 4/2016 | Harris | G06V 20/20 |
| | | | 345/156 |
| 2017/0132839 A1* | 5/2017 | Ambrus | G02B 27/0172 |
| 2017/0140457 A1 | 5/2017 | Kaku et al. | |
| 2017/0162177 A1* | 6/2017 | Lebeck | G06F 21/6218 |
| 2018/0136465 A1* | 5/2018 | Chi | G06F 3/0416 |
| 2018/0190022 A1* | 7/2018 | Zamir | G06T 19/006 |
| 2018/0350144 A1* | 12/2018 | Rathod | G06Q 20/3276 |
| 2020/0184219 A1* | 6/2020 | Mugura | G06V 20/20 |
| 2021/0012572 A1* | 1/2021 | Ishigaki | G06T 19/006 |

FOREIGN PATENT DOCUMENTS

| | | | | |
|---|---|---|---|---|
| JP | H08-190640 A | 7/1996 | | |
| JP | 2001325536 A | 11/2001 | | |
| JP | 2014535112 A | 12/2014 | | |
| JP | 2015114757 A | 6/2015 | | |
| JP | 2015523624 A | 8/2015 | | |
| JP | 6720385 B1 * | 7/2020 | | G02B 27/0093 |
| WO | WO2015/145544 A1 | 10/2015 | | |
| WO | WO-2020157995 A1 * | 8/2020 | | G06K 9/00671 |

OTHER PUBLICATIONS

Machine English translation of JP2001325536A, Nov. 22, 2001, 14 pgs.

* cited by examiner

FIG.6

PRODUCT DB

| PRODUCT ID | DISPLAY DATA | DISPLAY POSITION INFORMATION | MANAGER ID |
|---|---|---|---|
| 0001 | .... | .... | aaa |
| 0002 | .... | .... | bbb |
| 0003 | .... | .... | ccc |
| .... | .... | .... | .... |

…

PROGRAM, INFORMATION PROCESSING METHOD, AND INFORMATION PROCESSING TERMINAL

CROSS-REFERENCE TO RELATED APPLICATION

The present application is a continuation application of PCT Patent Application No. PCT/JP2019/005615, entitled "PROGRAM, INFORMATION PROCESSING METHOD, AND INFORMATION PROCESSING TERMINAL" filed on Feb. 15, 2019, which claims priority to Japanese Patent Application No. 2019-012358 filed on Jan. 28, 2019, the content of which is incorporated herein by reference in their entirety.

TECHNICAL FIELD

The present invention relates to a program, an information processing method, and an information processing terminal.

BACKGROUND ART

Online shopping that means purchasing a product over a network, such as the Internet, has been prevalent. While this allows purchase of a product present at a long distance, determination has to be made as to whether a product is good or not only by using product information and an image. For this reason, a VR (Virtual Reality) shopping technology that allows construction of a shop in VR and checking of a product from every angle of 360 degrees is on the rise.

For example, Patent Literature 1 discloses a virtual mall store layout system capable of constructing, in real time, a virtual mall/shop reflecting customer characteristics for each customer in an online shopping service. The system automatically collects footprint data of a customer on the basis of the motion of a mouse of a utilizer terminal without causing the customer to express its intention and acquires product information which is of interest to the customer.

SUMMARY OF INVENTION

Technical Problem

The danger of walking while using a smartphone (smartphone use while walking) is talked about these days. Since application of the above-described conventional technique to a smartphone involves the risk of an accident, it is difficult to do shopping at the time of movement on foot or by bicycle.

An object of the present disclosure is to provide a program, an information processing method, and an information processing terminal capable of offering an experience in safely conducting electronic commerce, such as online shopping, even during movement.

Solution to Problem

A program according to an aspect of the present invention causes an information processing terminal to execute a step of acquiring position information indicating a position of the information processing terminal, a step of transmitting the position information to an information processing apparatus, a step of receiving display data related to one or more products which is associated with the position information from the information processing apparatus, a step of acquiring a first region which satisfies a predetermined condition related to safety of a user, the first region being a region in an image taken by an image pickup unit, and a step of outputting the display data related to the one or more products to the acquired first region in a real space corresponding to the image or the image.

Advantageous Effect of Invention

According to the present disclosure, it is possible to offer an experience in safely conducting electronic commerce, such as online shopping, even during movement.

BRIEF DESCRIPTION OF DRAWINGS

FIG. 6 is a chart showing an example of a product DB.

DESCRIPTION OF EMBODIMENT

Figure 1:
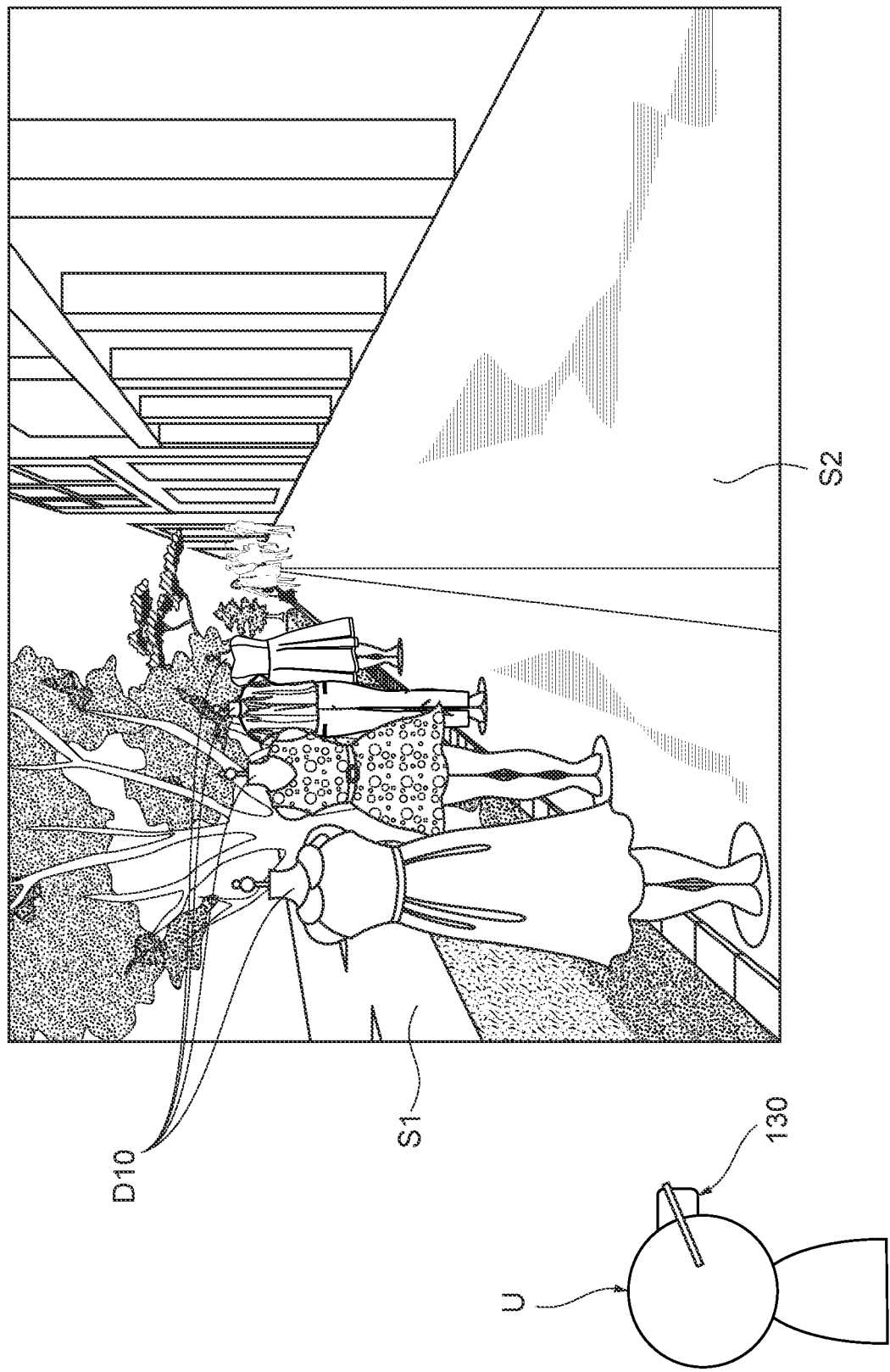
FIG. 1 is a view for explaining an overview of a system according to the present embodiment.

A preferred embodiment of the present disclosure will be described with reference to the accompanying drawings. Note that elements denoted by identical reference numerals in the drawings have identical or similar configurations.

Overview of System

FIG. 1 is a view for explaining an overview of a system according to the present embodiment. The present system is a system used to provide electric commerce (EC) and uses spectacles having an image pickup unit and an output unit as an example of an information processing terminal 130 which a user U wears or holds. For example, the user U wearing the information processing terminal 130 can do window-shopping during a stroll around a city. The information processing terminal 130 transmits position information to a server on an as-needed basis.

The server acquires, from a database, display data related to a product corresponding to the position information transmitted from the information processing terminal 130 and transmits the display data to the information processing terminal 130. The display data refers to data for displaying information (product information) related to a product on the information processing terminal 130. The display data may be one including at least one of 3D model data, 2D (two-dimensional) image data (which may be moving image data), and data indicating product discount information. Alternatively, the display data may further include attribute data indicating an attribute of the product. Examples of the attribute data may include, but are not limited to, a name, a price, a specification, a product number, and a category name of the product. The following description will be given on the assumption that display data of a product to be transmitted from a server 110 to the information processing terminal 130 is a 3D model, unless otherwise specified. The description is not intended to limit display data to a 3D model.

The information processing terminal 130 determines a position where the received display data is to be displayed on the basis of a camera image taken. The information processing terminal 130 displays the received display data in a region in the camera image which satisfies a predetermined condition related to safety (safety when a user passes or safety when the user views superimposed display data) of the user U. Examples of the region satisfying the predetermined condition related to the safety of the user U include, but are not limited to, a region which is recognized as a place which the user U can safely enter, a region which is recognized as a place where the user U can safely walk, a region other than a region which the user U is prohibited to enter for safety reasons, and a region other than a region where the user U may be exposed to a danger.

Examples of a predetermined condition for identification of a region which is recognized as a place where the user U can safely walk include, but are not limited to, that a pedestrian be in a region which is identified from a camera image, that a region in question be a region which is sandwiched between a curbstone and a construction, and that a region in question be a region having a pattern which is registered in advance as a pattern for identification of a sidewalk. Examples of a predetermined condition for identification of a region other than a region which the user U is prohibited to enter for safety reasons or a region other than a region where the user U may be exposed to a danger include, but are not limited to, that an automobile, a street centerline, a lane line, or a crosswalk be not in a region which is identified from a camera image, that a sign indicating prohibition of entry or a character string which prohibits entry of a person be not present, that a railroad crossing, a railroad track, ballast, or a train be not present, and that yellow linear Braille blocks be not present.

Specific examples of a region which satisfies the predetermined condition related to the safety of the user U include a sidewalk, a park, a public area, an inside of a building, accessible premises, something other than private land, a region other than a danger region, a region other than stairs, a region other than a place where someone else is standing, a region other than a region where an obstacle is present, a region other than a region between an obstacle and the user U, and/or an inside of a yellow line or a white line at an end of a station platform. A region satisfying the predetermined condition related to the safety of the user U will be referred to as a "safe region" or a "first region" below for the sake of convenience.

In the example in FIG. 1, a camera image includes a street S1 and a sidewalk S2. For example, the information processing terminal 130 identifies a boundary between the street S1 and the sidewalk S2, a region of the street S1, and a region of the sidewalk S2 by using semantic segmentation technology for image pixel analysis or collating a 3D map obtained by scanning a real world in advance with the camera image. The information processing terminal 130, for example, judges that the region of the street S1 is unsuitable as a display position for 3D models D10 and determines the region of the sidewalk S2 as the display position. As a result, as shown in FIG. 1, the 3D models D10 can be displayed, for example, along the sidewalk S2 on the ground.

As described above, since the 3D models D10 of products are displayed on the sidewalk, the user U can view the products as if the user U were doing window-shopping while moving on foot. Additionally, since control is performed such that the 3D models D10 of products are not displayed on the street S1, the user U can be prevented from entering the street even if the user U is absorbed in viewing products. Note that, as described earlier, determination of the display position for the 3D models D10 is not based solely on whether a street or a sideway. For example, a configuration in which nothing is displayed in private land, in a danger place, and on stairs if indoors may be adopted. Alternatively, the information processing terminal 130 may identify an obstacle or a person and perform control such that nothing is displayed between the obstacle and the user U.

The user U can mark a displayed 3D model D10 as a favorite. For example, the information processing terminal 130 may identify a 3D model D10 which the user U's gaze lies on, using gaze tracking technology, head tracking, or position tracking. If a distance between a position of a hand which can be acquired by position tracking and a displayed 3D model becomes shorter or if the user U makes a gesture in a state where the distance therebetween is short, the information processing terminal 130 determines that the user U has selected the 3D model. When the user U gives an instruction to register a particular product using, e.g., a smart ring, a gesture, or voice recognition, the information processing terminal 130 may mark an identified 3D model D10 as a favorite.

The system overview has been described above. If a position of the information processing terminal 130 can be estimated on the basis of, e.g., information of a 3D map obtained by scanning in advance the real world, or Bluetooth®, the system according to the present embodiment may be utilized indoors.

System Configuration

Figure 2:
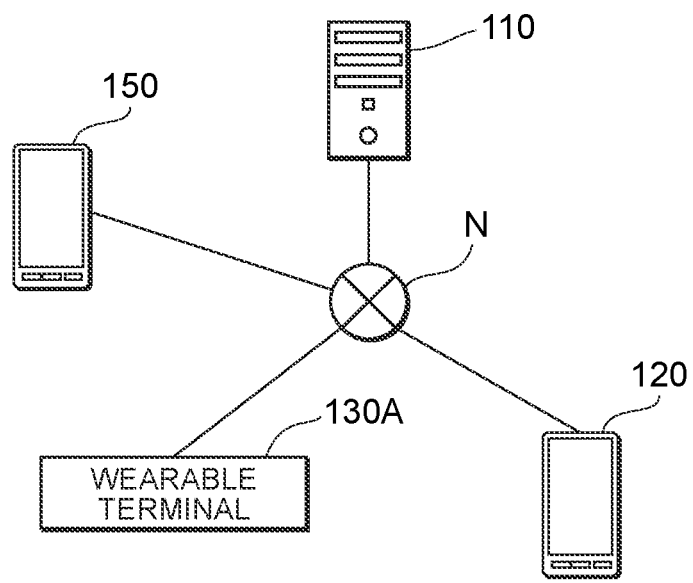
FIG. 2 is a diagram showing a communication system according to the present embodiment.

FIG. 2 is a diagram showing a communication system 1 according to the present embodiment. The communication system 1 is a system which executes the processing described with reference to FIG. 1 and includes a server (information processing apparatus) 110, a wearable terminal 130A and a terminal 130B, and a terminal 150. The server 110, the wearable terminal 130A, the terminal 130B, and the terminal 150 are connected over a communication network N, such as the Internet, a wireless LAN, Bluetooth®, or wire communication, so as to be capable of communication with one another. Note that the numbers of servers 110, wearable terminals 130A, terminals 130B, and terminals 150 which the communication system 1 includes are not limited to one and may be two or more. Alternatively, the server 110 may be composed of one piece of equipment or a plurality of pieces of equipment or may be a server which is implemented on a cloud.

The server 110 receives position information from the wearable terminal 130A or the terminal 130B and transmits display data related to a product corresponding to the received position information to the information processing terminal 130.

The wearable terminal 130A may be, for example, a spectacle type terminal (smart glasses), a contact lens type terminal (smart contact lenses), a head mounted display, or an artificial eye which can utilize augmented reality (AR) technology. Note that the wearable terminal is not limited to one which uses AR technology and may be one which uses technology, such as mediated reality, mixed reality, virtual reality, or diminished reality.

The terminal 130B is an electronic device which the user U utilizes. The terminal 130B may be, for example, a smartphone, a tablet terminal, a cellular phone handset, a personal computer (PC), a personal digital assistant (PDA), or a videogame console. The wearable terminal 130A and the terminal 130B will be collectively referred to as information processing terminals hereinafter if distinction therebetween is unnecessary. Note that the terminal 130B is not a required component for the information processing terminal 130, the wearable terminal 130A may also have a function of the terminal 130B, and that a configuration without the function of the terminal 130B may be adopted. The terminal 130A is not a required component for the information processing terminal 130, and a configuration without the wearable terminal 130A may be adopted.

The terminal 150 is an information processing terminal which a manager of a product utilizes. The terminal 150 may be a smartphone, a tablet terminal, a cellular phone handset, a personal computer (PC), a personal digital assistant (PDA), a videogame console, or the like. Note that examples of the manager of the product include, but are not limited to, a seller of the product, a distributor of the product, an explainer of the product, and a person which registers a 3D model of the product in the server 110.

Hardware Configuration

Figure 3:
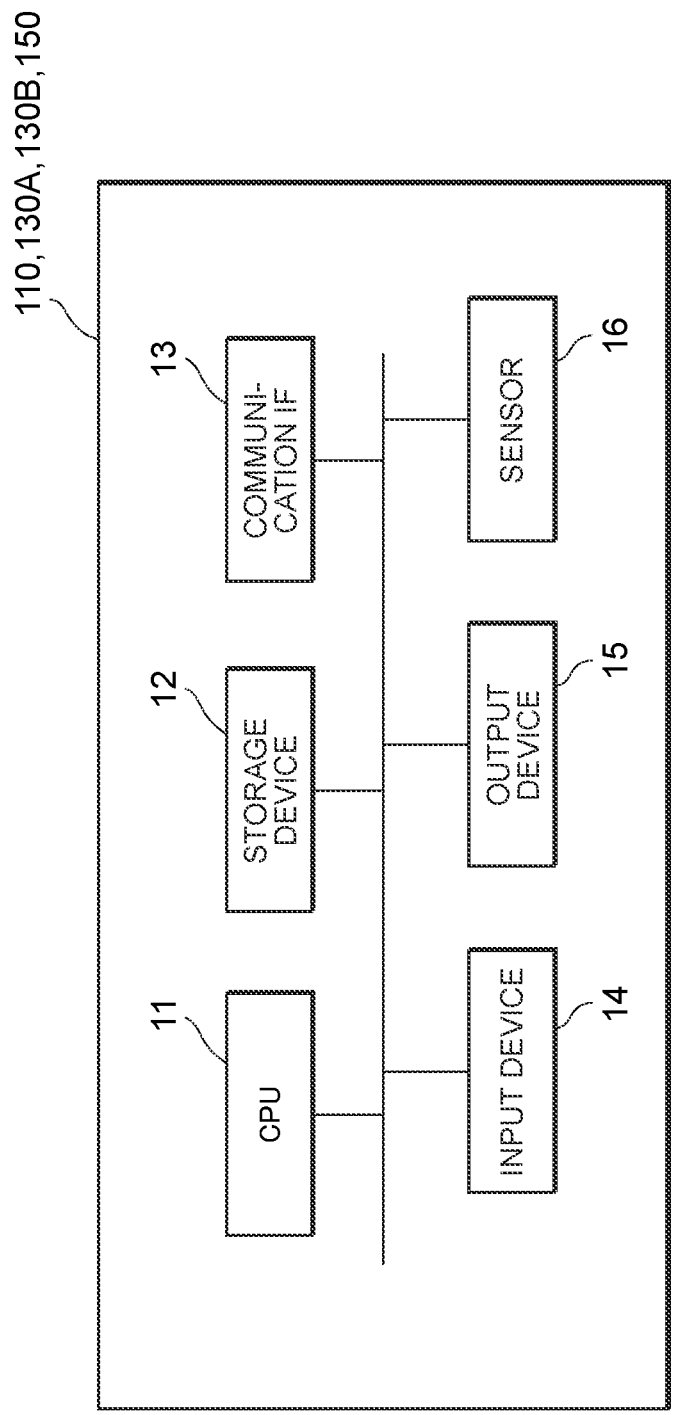
FIG. 3 is a diagram showing an example of a hardware configuration of the communication system according to the present embodiment.

FIG. 3 is a diagram showing an example of a hardware configuration of each of the server 110, the wearable terminal 130A, the terminal 130B, and the terminal 150. The server 110, the wearable terminal 130A, the terminal 130B, and the terminal 150 each have a CPU (Central Processing Unit) 11, a storage device 12, such as a memory, an HDD (Hard Disk Drive), and/or an SSD (Solid State Drive), a communication IF (Interface) 13 for wire or wireless communication, an input device 14 which accepts an input operation, an output device 15 which outputs information, and a sensor 16. The input device 14 is, for example, a keyboard, a touch panel, a mouse, a microphone, an input device 14 (e.g., a ring type wearable apparatus called a smart ring) which is attached to a body of the user U, and/or an image pickup apparatus (a two-dimensional camera or a depth camera). The output device 15 is, for example, a display (which may be of a retinal scanning type) and/or a speaker. The sensor 16 is, for example, a GPS positioning sensor, a gyroscope sensor, a magnetic field sensor, or a gaze detection sensor.

Note that each of the server 110, the wearable terminal 130A, the terminal 130B, and the terminal 150 may not include one(s) of the pieces of hardware shown in FIG. 3. For example, the sensor 16 may not be included in each of the server 110, the terminal 130B, and the terminal 150.

Outward Appearance of Wearable Terminal 130A

Figure 4:
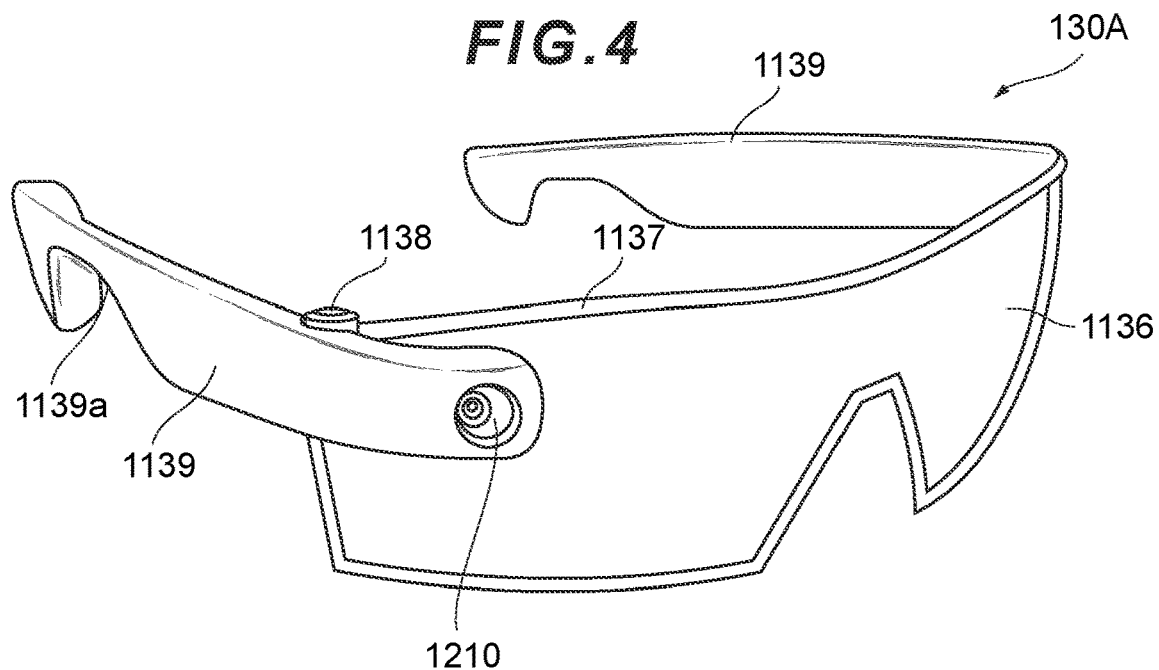
FIG. 4 is a view showing an example of an outward appearance of a wearable terminal according to the present embodiment.

FIG. 4 is a view showing an example of an outward appearance of the wearable terminal 130A according to the embodiment. The wearable terminal 130A includes an image pickup unit 1210, a display 1136, a frame 1137, hinge units 1138, and temples 1139.

The image pickup unit 1210 is a device for picking up an image (which may be a moving image hereinafter unless otherwise specified). The image pickup unit 1210 may include an image pickup element (not shown), such as a CCD image sensor, a CMOS image sensor, or a lens. The image pickup unit 1210 may be provided at a position where an image can be picked up in a gaze direction of the user U. Another image pickup unit may be provided at a position where an image of the user's eye can be picked up and the user's gaze can be detected.

The display 1136 is the output device 15 that displays various types of information, such as product information, under control of an output unit 137 (to be described later). The display 1136 may be formed of a member which transmits visible light such that the user U wearing the wearable terminal 130A can visually recognize a real-space landscape. For example, the display 1136 may be a liquid crystal display or an organic EL display using a transparent substrate. Alternatively, the display 1136 may be a retinal scanning type display which causes information to be displayed on a human retina.

The frame 1137 is provided so as to surround an outer periphery of the display 1136 and protects the display 1136 against shock and the like. The frame 1137 may be provided over a whole area of the outer periphery of the display 1136 or may be provided at a part thereof. The frame 1137 may be formed of, for example, metal or resin.

Each hinge unit 1138 connects the temple 1139 to the frame 1137 such that the temple 1139 is pivotable. The temples 1139 are temples which extend from two ends of the frame 1137 and may be formed of, for example, metal or resin. The wearable terminal 130A is worn such that the temples 1139 spread so as to be separated from the frame 1137 are located near temples of the user U.

Each temple 1139 has a locking portion 1139a which is partially recessed. The locking portion 1139a is located around an ear of the user U in state where the wearable terminal 130A is worn to prevent the wearable terminal 130A from coming off from a head of the user U.

Functional Configuration
(Functional Configuration of Server 110)

Figure 5:
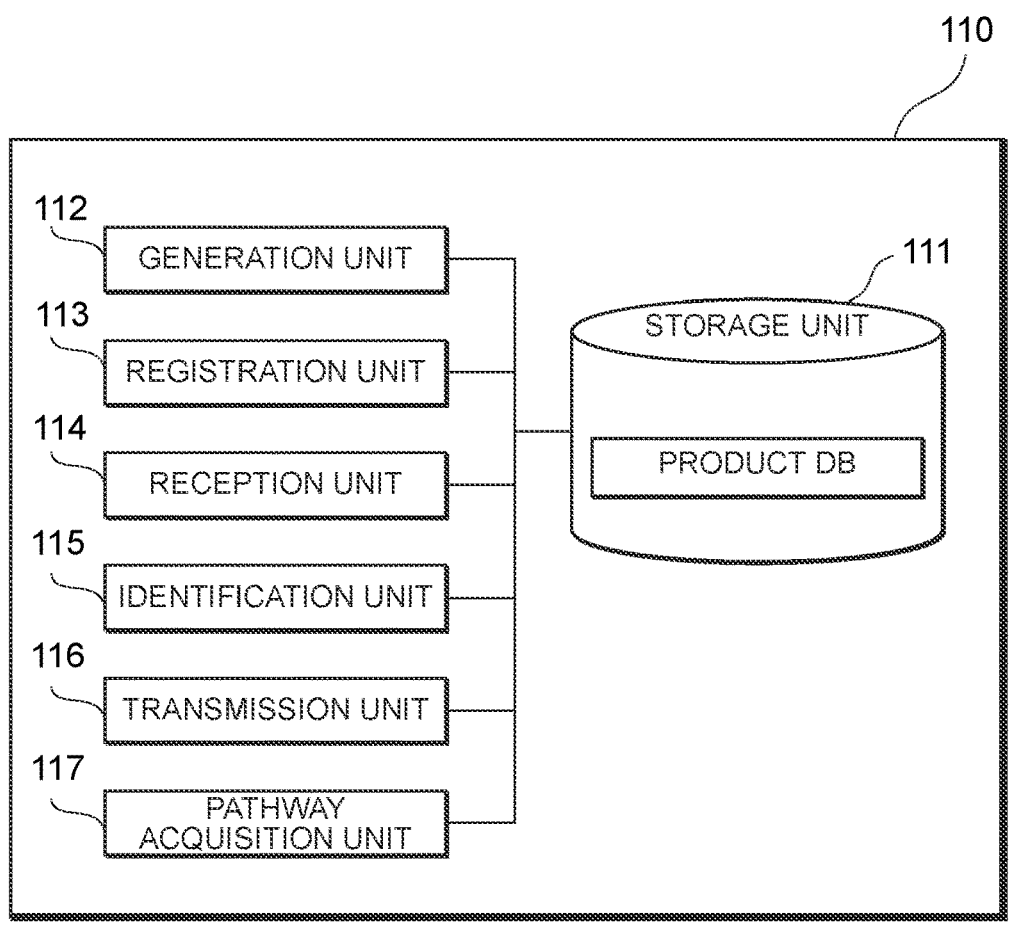
FIG. 5 is a diagram showing an example of a functional configuration of a server according to the present embodiment.

FIG. 5 is a diagram showing an example of a functional configuration of the server 110 according to the present embodiment. In the example shown in FIG. 5, the server 110 includes a storage unit 111, a generation unit 112, a registration unit 113, a reception unit 114, an identification unit 115, a transmission unit 116, and a pathway acquisition unit 117. The generation unit 112, the registration unit 113, the reception unit 114, the identification unit 115, the transmission unit 116, and the pathway acquisition unit 117 can be implemented through execution of a program which is stored in the storage device 12 by the CPU 11 of the server 110. The program can be stored in a storage medium. The storage medium storing the program may be a computer readable non-transitory storage medium (non-transitory computer readable medium). The non-transitory storage medium is not particularly limited and may be, for example, a storage medium, such as a USB memory or a CD-ROM. The storage unit 111 can be implemented using the storage device 12 that the server 110 includes.

The storage unit 111 stores a product DB in which product information, display position information indicating a position where a product is to be displayed, and display data related to the product are associated with one another.

FIG. 6 is a chart showing an example of the product DB. A product ID refers to an identifier for unique identification of a product in the product DB. 3D model data, image data, data indicating discount information of the product, and/or attribute data of the product is stored as display data. Data which causes a 3D model to work arbitrarily may be included in 3D model data. For example, generation of 3D model data in a format, such as glTF, allows a 3D model to work dynamically. Information indicating a position (or a range) where the display data is to be displayed is stored as display position information. The information may be, for example, information expressed as a longitude and a latitude or information indicating a particular place (e.g., information indicating an address or a park). A plurality of pieces of display position information may be stored as the display position information. That is, pieces of display data and pieces of display position information may be associated on a one-to-one basis or on a one-to-N (-multiple) basis. An identifier indicating a manager of the product is stored as a manager ID. Information, by which the terminal 150 utilized by the manager can be called, may be included in the manager ID. The information may be, for example, a phone number, an e-mail address, or an ID assigned by an application which the manager utilizes on the terminal 150.

Note that display data may be linked to display position information on the basis of a category for a product which is included in attribute data of the product. For example, the idea of associating a suit with display position information of a business area and associating a product for daily use with display position information of a residential area is conceivable. With this idea, products for daily use are displayed on the information processing terminal 130 when the user U is in a residential area, and suits are displayed on the information processing terminal 130 when the user U is in a business area. Referring back to FIG. 5, the description will be continued.

The generation unit 112 generates display data related to a product from image-taking data obtained through taking an image of the product. For example, the generation unit 112 generates the display data related to the product by analyzing a plurality of pieces of image data or moving image data which are obtained by taking an image of surroundings of the product. The taking an image of the product may be performed by, for example, a predetermined user relevant to the product, and image-taking data of the product may be transmitted from the terminal 150 utilized by the user to the server 110.

Examples of the predetermined user relevant to the product include, but are not limited to, a user (e.g., a manager) of a shop which provides the product, a utilizer of the shop, or a system provider. The display data may be generated by the system provider, a vendor requested by the system provider, or the like. Additionally, the display data may be generated in real time.

The registration unit 113 associates display data related to a product with display position information and stores the resultant in the product DB. Association of the product with the display position information may be performed by a predetermined user relevant to the product, the system provider, or the like. A function capable of associating a product with display position information by, for example, placing the product on a map (which may be two-dimensional or three-dimensional) may be provided to the predetermined user that registers a product.

The reception unit 114 receives position information indicating a position of the information processing terminal 130 from the information processing terminal 130. The reception unit 114 also receives image data obtained through image-taking by the information processing terminal 130.

The identification unit 115 identifies, from among one or more pieces of display data related respectively to one or more products which are stored in the storage unit 111 and with which one or more pieces of display position information are correlated, the piece of display data related to one or more products that is correlated with the piece of display position information within a predetermined distance from a position indicated by position information received by the reception unit 114. For example, the identification unit 115 may perform display data identification by searching for display data, display position information for which is within the predetermined distance from the position of the information processing terminal 130, in the product DB.

The transmission unit 116 transmits display data related to one or more products which is to be displayed in a region in an image taken by an image pickup unit which satisfies the predetermined condition related to the safety of the user U to the information processing terminal 130.

The pathway acquisition unit 117 acquires a pathway to a destination desired by the user U from a current position of the user U by, for example, making a search of map data or the like.

(Functional Configuration of Information Processing Terminal 130)

Figure 7:
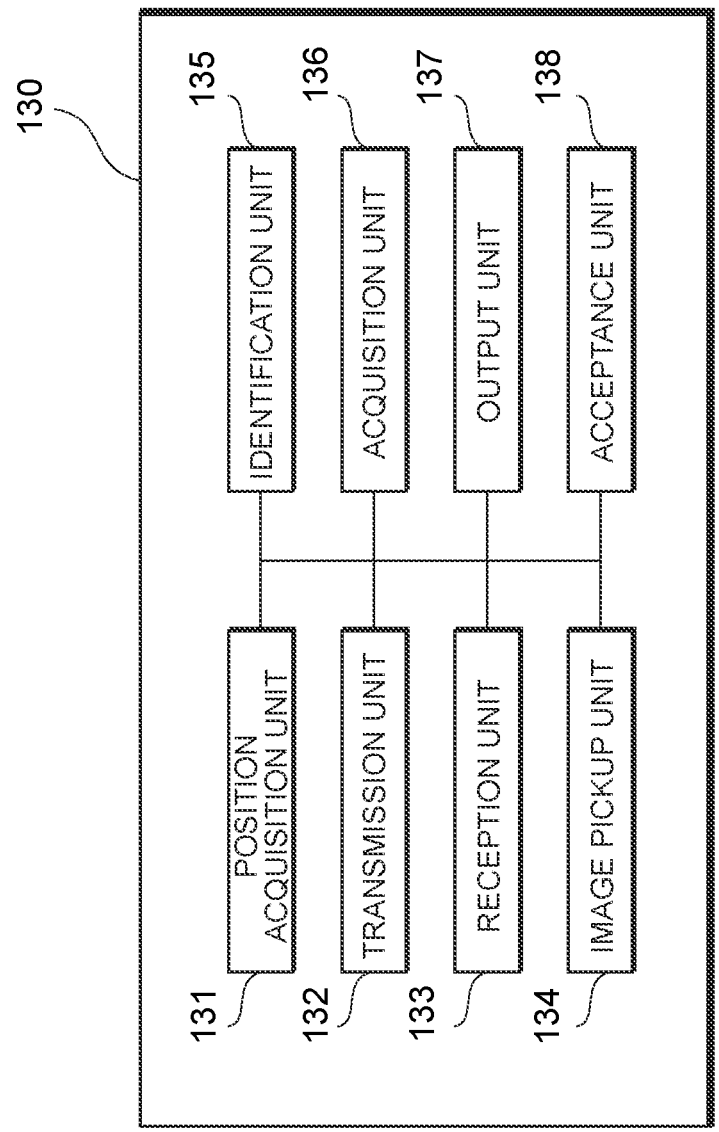
FIG. 7 is a diagram showing an example of functions of an information processing terminal according to the present embodiment.

FIG. 7 is a diagram showing an example of functions of the information processing terminal 130 according to the present embodiment. In the example shown in FIG. 7, the information processing terminal 130 includes a position acquisition unit 131, a transmission unit 132, a reception unit 133, an image pickup unit 134, an identification unit 135, an acquisition unit 136, the output unit 137, and an acceptance unit 138. The position acquisition unit 131, the transmission unit 132, the reception unit 133, the image pickup unit 134, the identification unit 135, the acquisition unit 136, the output unit 137, and the acceptance unit 138 can be implemented through execution of a program which is stored in the storage device 12 by the CPU 11 of the information processing terminal 130. The program can be stored in a storage medium. The storage medium storing the program may be a computer readable non-transitory storage medium. The non-transitory storage medium is not particularly limited and may be, for example, a storage medium, such as a USB memory or a CD-ROM. The program may be a program (application) which can be downloaded from the server 110 and be installed on the information processing terminal 130.

The position acquisition unit 131 acquires position information indicating the position of the information processing terminal 130 itself. As for the position information, the position acquisition unit 131 may acquire the position information of the information processing terminal 130 using GPS, a beacon, or VPS (Visual Positioning Service) which is publicly known.

The transmission unit 132 transmits position information acquired by the position acquisition unit 131 to the server 110. The transmission unit 132 may transmit information for identification of a product accepted by the acceptance unit 138 (to be described later) to the server 110.

The reception unit 133 receives display data related to one or more products which is associated with the position information of the information processing terminal 130 from the server 110. The reception unit 133 may receive pieces of attribute data of one or more products from the server 110.

The reception unit 133 may receive, from the server 110 or a different information processing apparatus (e.g., the terminal 150), display data of a manager (a user as a seller) for a particular product (a first product) included in one or more products to be displayed in a safe region which is obtained by taking an image of the manager. Examples of the display data of the manager include, but are not limited to, a moving image obtained through taking an image of the manager or 3D model data of the manager which is generated through taking an image of surroundings of the manager.

The image pickup unit 134 takes an image in a direction which the image pickup apparatus faces, using the input device 14 (an image pickup apparatus).

The identification unit 135 identifies a safe region from a region in an image which is taken by the image pickup unit 134. A method, by which the identification unit 135 identifies a safe region, will be described later.

The acquisition unit 136 acquires, from the identification unit 135, information indicating a safe region of a region in a taken image which is identified by the identification unit 135. Note that the identification unit 135 may be mounted on the server 110 side instead of being mounted on the information processing terminal 130. In this case, the transmission unit 132 transmits an image which is taken by the image pickup unit 134 to the server 110, and the acquisition unit 136 acquires data indicating a safe region of a region in the taken image from the server 110.

The acquisition unit 136 may acquire pathway information indicating a pathway, by which a user moves, from the server 110 or the different information processing apparatus (e.g., the terminal 150). The pathway, by which the user moves, refers to a walking pathway from a current position to a destination designated by the user which is generated using, e.g., a pedestrian navigation service.

The output unit 137 outputs display data related to one or more products to a safe region which is acquired by the acquisition unit 136 in a real space corresponding to an image or a moving image which is taken by the image pickup unit 134 or the image or moving image taken by the image pickup unit 134.

If the information processing terminal 130 is the wearable terminal 130A, the output unit 137 outputs display data to a position overlapping with a safe region which is visually recognized by the user with the naked eyes. For example, if the output device 15 is a liquid crystal display or an organic EL display using a transparent substrate, the output unit 137 displays display data at a position overlapping with a safe region which is visually recognized by the user via the transparent foundation. For example, if the output device 15 is a retinal scanning type display, the output unit 137 outputs display data toward a region of each retina of the user which overlaps with a region where a safe region is on the retina. If the information processing terminal 130 is the terminal 130B, the output unit 137 displays display data to a position overlapping with a safe region of a region in an image which is taken by the image pickup unit 134.

Note that the output unit 137 may output one or more pieces of display data such that the one or more pieces of display data are arranged along a boundary of a safe region. The boundary of the safe region may be, for example, a region between a borderline between the safe region and a region other than the safe region and a position in the safe region which is a predetermined distance (e.g., 1 meter or 2 meters in the real world) away from the borderline.

The output unit 137 may output display data related to a manager which is received by the reception unit 133 in association with display data of a particular product (the first product) included in one or more products to be displayed in a safe region. For example, the output unit 137 may output the display data related to the manager adjacent to the particular product. This allows the user to perform product selection while receiving an explanation on the particular product from the manager.

When the output unit 137 is to output display data related to one or more products to a safe region, the output unit 137 may output the display data related to the one or more products along a pathway indicated by pathway information indicating the pathway, by which the user moves, which is acquired by the acquisition unit 136. With this configuration, display data is displayed on a walking pathway for the user. The user can view products without deviating from the pathway as if the user were doing window-shopping while moving to a destination.

When the information processing terminal 130 moves in a direction toward particular display data (first display data) included in display data related to one or more products, the output unit 137 may output attribute data of a product corresponding to the particular display data. The output unit 137 can judge whether the information processing terminal 130 has approached the display data by storing a position of first-time output of display data and comparing the position with the current position of the user U (a current position of the information processing terminal 130).

For example, the output unit 137 may switch between displaying a name, a price, and the like of a product near display data when the user U approaches the display data and not displaying the name, the price, and the like of the product when the user U moves away from the display data. This makes it possible to, even if display data related to many products is displayed within a screen, prevent visibility from deteriorating due to display of characters in the names, prices, and the like of the products in large amounts.

The acceptance unit 138 accepts, from among display data related to one or more products which is output by the output unit 137, selection of one or more products in question. For example, the acceptance unit 138 may accept selection of a product by detecting an instruction from the user given by using the input device 14. Alternatively, the acceptance unit 138 may accept selection of a product by analyzing an image which is taken by the image pickup unit 134 and detecting that the user has made a particular gesture. Alternatively, the acceptance unit 138 may accept selection of a product by detecting a product which the user's gaze lies on for a predetermined time period, using a gaze detection sensor which is the sensor 16.

(Functional Configuration of Terminal 150)

Figure 8:
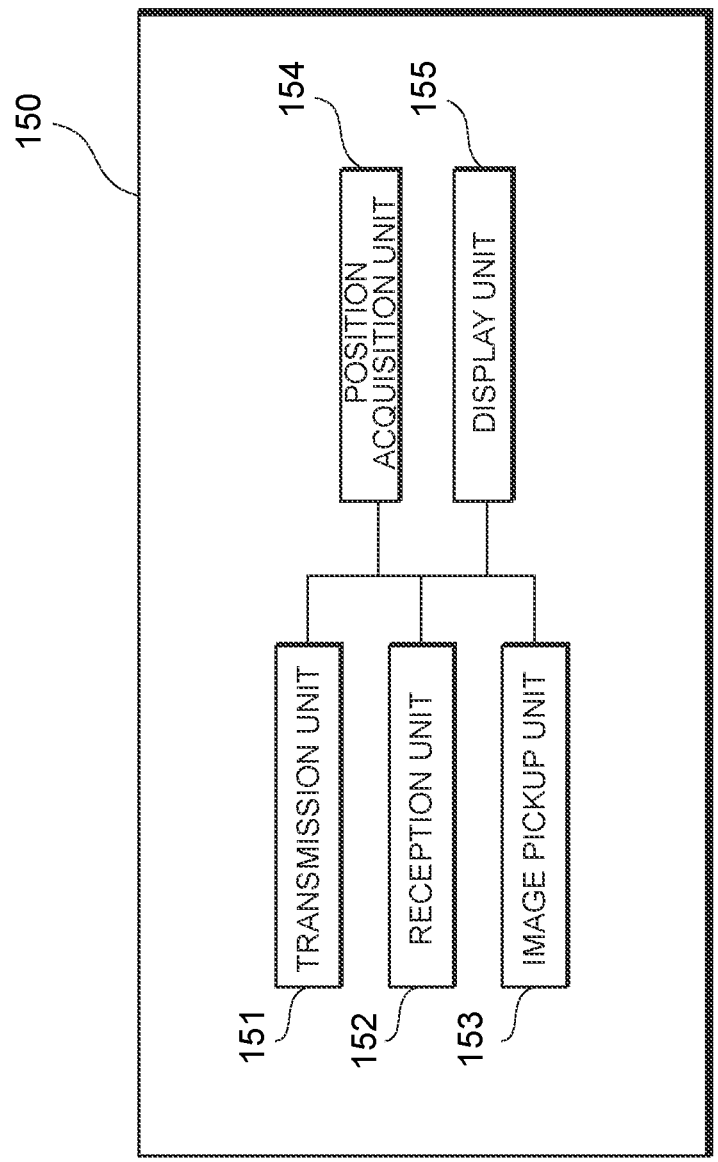
FIG. 8 is a diagram showing an example of functions of a terminal according to the present embodiment.

FIG. 8 is a diagram showing an example of functions of the terminal 150 according to the present embodiment. In the example shown in FIG. 8, the terminal 150 includes a transmission unit 151, a reception unit 152, an image pickup unit 153, a position acquisition unit 154, a display unit 155, and a generation processing unit 156. The transmission unit 151, the reception unit 152, the image pickup unit 153, the position acquisition unit 154, the display unit 155, and the generation processing unit 156 can be implemented through execution of a program which is stored in the storage device 12 by the CPU 11 of the terminal 150. The program can be stored in a storage medium. The storage medium storing the program may be a computer readable non-transitory storage medium. The non-transitory storage medium is not particularly limited and may be, for example, a storage medium, such as a USB memory or a CD-ROM. The program may be a program (application) which can be downloaded from the server 110 and be installed on the terminal 150.

The transmission unit 151 transmits various types of information to the server 110 or the information processing terminal 130. The reception unit 152 receives various types of information from the server 110 or the information processing terminal 130.

The image pickup unit 153 takes an image of a product or a manager of the product using the input device 14 (an image pickup apparatus). The image pickup apparatus may be an image pickup apparatus which is built into the terminal 150 or a plurality of image pickup apparatuses which are connected to the terminal 150. The plurality of image pickup apparatuses may be, for example, a plurality of image pickup apparatuses which are arranged so as to surround the product or the manager of the product. The image pickup unit 153 transmits a taken image to the server 110 via the transmission unit 151.

The position acquisition unit 154 acquires position information indicating a position of the terminal 150 itself. As for the position information, the position acquisition unit 154 may acquire the position information of the information processing terminal 130 using GPS, a beacon, or VPS which is publicly known.

The display unit 155 displays predetermined information on a display as the output device 15. For example, the display unit 155 may display, on the display, an image which is received from the information processing terminal 130 by the reception unit 152 and is identical to an image being viewed using the information processing terminal 130 by the user U. In this case, the display may be a display which the terminal 150 includes or an external display which can communicate with the terminal 150.

Procedures

Procedures to be performed by the communication system 1 according to the present embodiment will be described below. The following description will be given using, as an example of an information processing terminal, a spectacle type terminal (smart glasses) which is the wearable terminal 130A. Display data related to a product will be explained as including 3D model data of the product. A manager of the product will be explained as being a seller of the product.

(Registration of Product)

Figure 9:
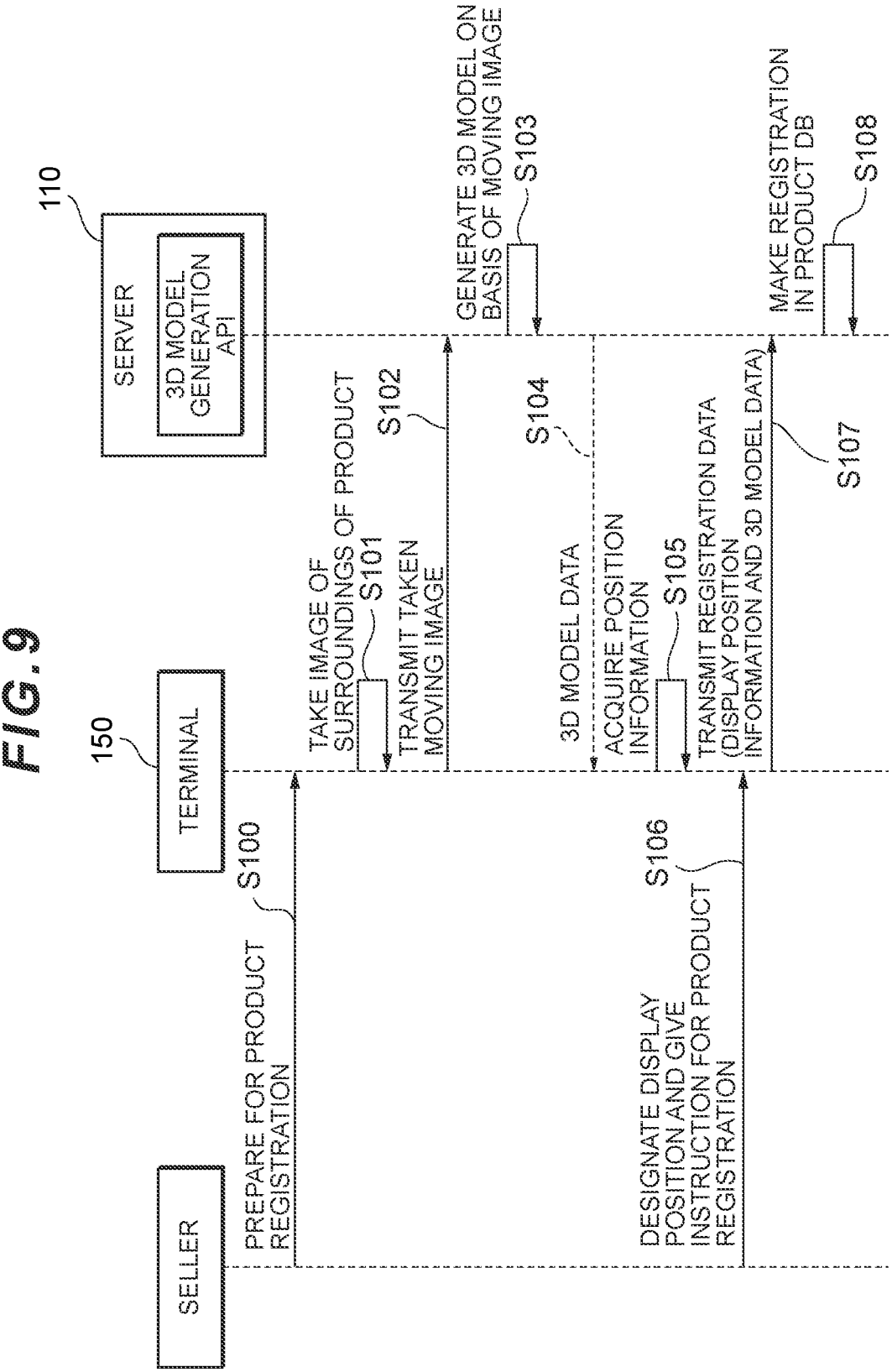
FIG. 9 is a sequence chart showing an example of procedures at the time of registration of a product in the server.

FIG. 9 is a sequence chart showing an example of procedures at the time of registration of a product in the server 110. Procedures when a seller of a product registers the product to be sold to the user U in the server 110 in order to put up the product for sale will be described with reference to FIG. 9.

In step S100, the seller of the product makes preparations for registration of the product in the server 110 by operating the terminal 150. The preparations for registration of the product include, for example, an operation of activating an application having the function of product registration, an operation of activating a camera, and the like.

In step S101, the seller takes an image of surroundings of the product using an image pickup apparatus which the terminal 150 includes or one or a plurality of image pickup apparatuses which are connected to the terminal 150.

In step S102, the transmission unit 151 of the terminal 150 transmits a moving image obtained by taking an image of the surroundings of the image-taken product to the server 110.

In step S103, the generation unit 112 of the server 110 generates 3D model data of the product by analyzing the moving image that is received from the terminal 150. The generation unit 112 may provide, for example, an API (Application Programming Interface) which generates a 3D model from a moving image and may generate 3D model data of the product by inputting moving image data to the API. Alternatively, the API may be provided by an external information processing apparatus different from the server 110, and the generation unit 112 may generate 3D model data of the product by utilizing the API provided by the external information processing apparatus.

In step S104, the transmission unit 116 of the server 110 transmits the generated 3D model data to the terminal 150.

In step S105, the position acquisition unit 154 of the terminal 150 acquires a current location of the terminal 150 itself. The position acquisition unit 154 of the terminal 150 may acquire position information designated by the user.

In step S106, the seller designates a display position where the product is to be displayed by operating the terminal 150. The seller may designate the position information acquired in step S105 as the display position or may directly designate the display position on, e.g., a map screen. At the time of the direct designation of the display position, the seller may designate the display position not only on a two-dimensional map but also on a three-dimensional map (e.g., designate a predetermined floor on the third floor of a building) or may designate a real place (e.g., designate a current position). The seller then instructs the terminal 150 to associate the designated display position information with the 3D model data and register the resultant in the server 110.

In step S107, the transmission unit 151 of the terminal 150 transmits registration data which includes the display position information and the 3D model data to the server 110.

In step S108, the registration unit 113 of the server 110 associates the display position information and the 3D model data that are received with each other and registers the resultant in the product DB.

In the procedures described above, the procedure in step S104 may be omitted, and the terminal 150 may transmit registration data including only the position information to the server 110 in the procedure in step S106. For example, the volume of communication between the terminal 150 and the server 110 can be reduced by temporarily storing the 3D model data large in data size in the server 110 without transmitting the 3D model data to the terminal 150.

In the procedure in step S106, the seller may input attribute data (e.g., a product name and a price) of the product to the terminal 150. The transmission unit 151 of the terminal 150 may transmit the attribute data input in step S107 to the server 110 together with the display position information and the display data. The registration unit 113 of the server 110 may register the display position information, the display data, and the attribute data in the product DB in step S108.

(Display of Product (I))

Figure 10:
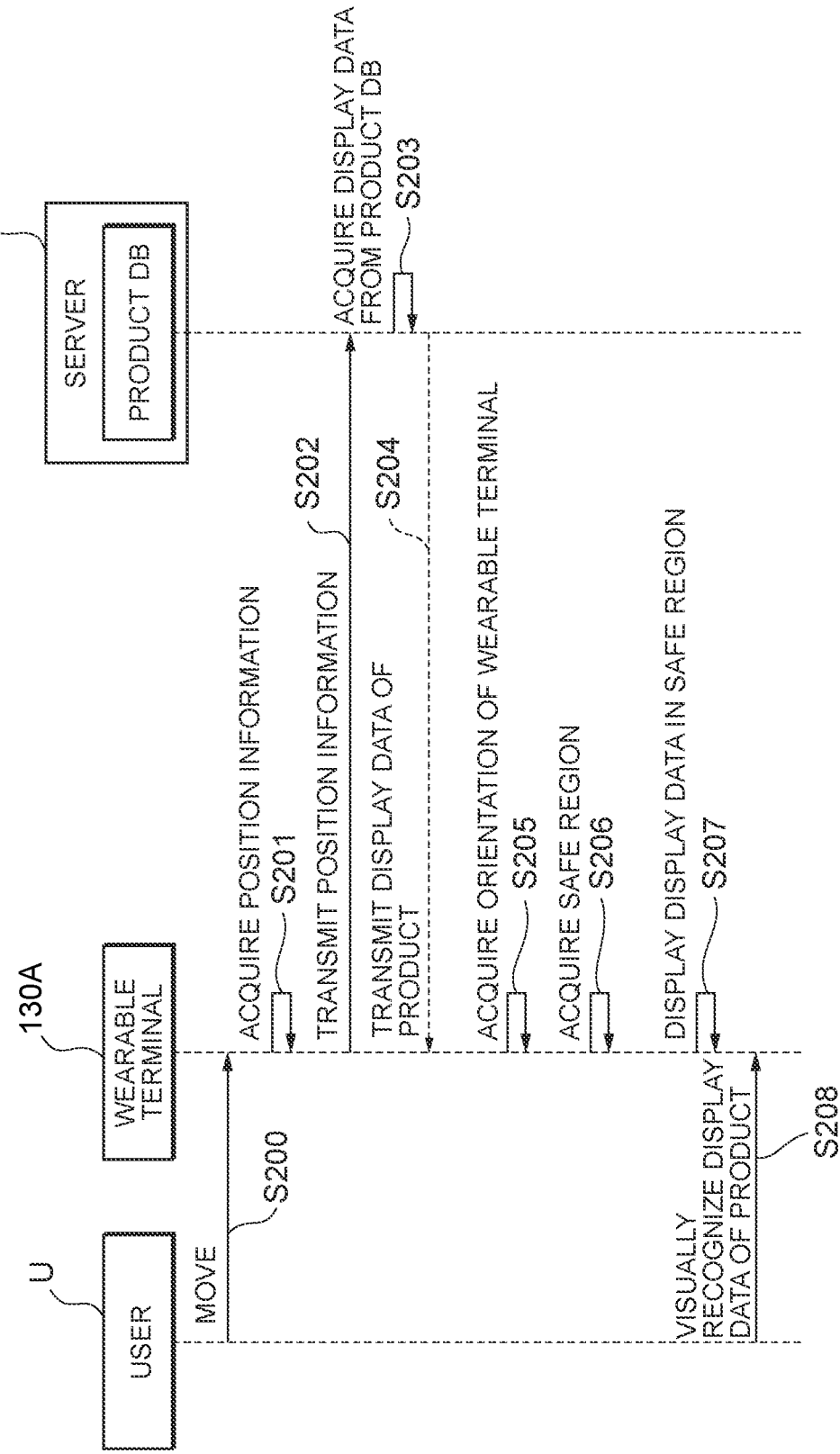
FIG. 10 is a sequence chart showing an example (I) of procedures at the time of display of a product in a field of vision of a user.

FIG. 10 is a sequence chart showing an example (I) of procedures at the time of display of a product in a field of vision of a user. Procedures when a product which is registered in the server 110 is displayed in a field of vision of the user U by AR technology will be described with reference to FIG. 10.

In step S200, the user U moves with the wearable terminal 130A on.

In step S201, the position acquisition unit 131 of the wearable terminal 130A acquires position information with movement of the user.

In step S202, the transmission unit 132 of the wearable terminal 130A transmits the acquired position information to the server 110.

In step S203, the identification unit 115 of the server 110 acquires display data related to one or more products by searching for display data, display position information for which is within a predetermined distance from a position of the wearable terminal 130A (e.g., a radius of 30 m, 50 m, or 100 m from the position of the wearable terminal 130A) in the product DB.

In step S204, the transmission unit 116 of the server 110 transmits the acquired display data related to the one or more products to the wearable terminal 130A.

In step S205, the position acquisition unit 131 of the wearable terminal 130A acquires an orientation of the wearable terminal 130A using an acceleration sensor and a magnetic sensor which are the sensor 16. The orientation of the wearable terminal 130A is expressed as, for example, three elements, an angle of a front direction of the wearable terminal 130A with respect to a particular direction (e.g., the north), an angle of a horizontal plane of the wearable terminal 130A with respect to a ground surface, and a rotation angle of the wearable terminal 130A, and indicates the gaze direction of the user.

In step S206, the image pickup unit 134 of the wearable terminal 130A takes an image of a real world in a direction which the user faces. The acquisition unit 136 of the wearable terminal 130A acquires information indicating a range of a safe region which is identified by the identification unit 135 from a region in an image obtained through the image-taking by the image pickup unit 134.

The identification unit 135 of the wearable terminal 130A may identify a safe region from the image by, for example, distinguishing pixels of the taken image using semantic segmentation technology, instance segmentation technology, or the like. For example, a learned model with learned skills to distinguish among a sidewalk, a street, and a building may be prepared in advance, and a taken image may be input to the learned model to distinguish among a region with a sidewalk in the image, a region with a street, and a region with a building. For example, a region which is not a safe region may be defined in advance, and the identification unit 135 may identify a region which is distinguished by learning as a safe region if the region is not the defined region. In contrast, a safe region may be defined in advance, and the identification unit 135 may identify a region which is distinguished by learning as a safe region if the region is the defined region. In this manner, the identification unit 135 can identify a region corresponding to a sidewalk in a taken image as a safe region.

For example, the identification unit 135 of the wearable terminal 130A may divide the taken image into a plurality of regions by distinguishing pixels of the image using semantic segmentation technology, instance segmentation technology, or the like and judge, through image analysis, whether each region satisfies the above-described predetermined condition related to the safety of the user U (i.e., whether each region is a safe region).

The identification unit 135 may identify a safe region from the region in the image taken by the image pickup unit 134, using 3D map information which is obtained by scanning the real world in advance and in which three-dimensional shapes of a road, a sidewalk, and a building are associated with categories (e.g., a sidewalk, a street, and a building) for the shapes. The 3D map information may be stored in the storage device 12 that the information processing terminal 130 includes. For example, the identification unit 135 may distinguish among a region with a sidewalk in the image, a region with a street, and a region with a building by collating the image taken by the image pickup unit 134 with the 3D map information. With this configuration, the identification unit 135 can identify a region corresponding to a sidewalk in a taken image as a safe region.

Data indicating a range of a safe region may be included in the 3D map information. For example, data indicating a safe region may be given in advance to a sidewalk, a park, or the like. Since the identification unit 135 can identify a safe region by collating the image taken by the image pickup unit 134 with the 3D map information, a process of identifying a safe region can be sped up.

The identification unit 135 may perform safe region identification by combining a plurality of pieces of information included in the image taken by the image pickup unit 134. For example, a region including a white line, a vending machine, a sign with a station name, or the like among regions in the image may be judged to be not a safe region. This is because, in this case, the user U is highly likely to be on a station platform, and display of a 3D model may bring the user U into the danger of falling. Note that the identification unit 135 may determine whether a danger region is present in the image. If the identification unit 135 determines that a danger region is present, the output unit 137 may output a three-dimensional or two-dimensional object alert to warn the user U or a route for avoiding a danger region (e.g., a manhole).

In step S207, the output unit 137 outputs the display data related to the one or more products received from the server 110 in step S204 to a ground surface in the safe region in a space within a viewing angle which is recognized by the user. If there is no space corresponding to a safe region, the output unit 137 does not output display data. If a plurality of pieces of display data are received from the server 110, the output unit 137 may output the plurality of pieces of display data such that the plurality of pieces of display data are arranged at predetermined intervals.

For example, display position information may be included in display data related to a product, of which the wearable terminal 130A is notified by the server 110, and the output unit 137 may perform control such that the display data related to the product is displayed at a position indicated by the display position information. Note that if a single seller registers a plurality of products, it is conceivable that a plurality of pieces of display data have identical pieces of display position information. In this case, the output unit 137 may move a display position of each piece of display data within a predetermined range so as to prevent overlap of the pieces of display data.

If a position indicated by display position information is not a specific position indicated by a latitude and a longitude but a rough position, such as an inside of a park, the output unit 137 may determine, by itself, a specific position where output data is to be output and store the specific position. For example, if the display position information is an inside of a park, the output unit 137 may determine an arbitrary place in the inside of the park as a position where display data is to be output.

If a position indicated by display position information is not in a safe region, and there is a safe region within a predetermined distance from the display position information, the output unit 137 may move a display position into the safe region. It is possible to inhibit display data related to a product from being buried without being displayed if display position information is set at a place which is not a safe region.

In step S208, the user U can enjoy window-shopping by visually recognizing a 3D model of the product which is displayed in the field of vision.

The procedures in steps S201 to S204 described above are repeatedly executed in response to movement of the user. For this reason, display data transmitted from the server 110 to the wearable terminal 130A in the procedure in step S204 is changed (updated) in response to the user's movement. For example, the server 110 may transmit display data related to a given product to the wearable terminal 130A if the wearable terminal 130A comes within a predetermined distance from display position information of the product and may notify the wearable terminal 130A that display of the display data is to be ceased if the wearable terminal 130A falls outside the predetermined distance from the display position information.

For example, assume that display position information of a product A is a point A which is specifically designated by a latitude and a longitude. Also, assume that the server 110 transmits display data, display position information for which is within 20 m from a current position of the wearable terminal 130A, to the wearable terminal 130A. In this case, if the user U wearing the wearable terminal 130A moves, and a distance between the user U and the point A becomes not more than 20 m, the server 110 transmits display data related to the product A to the user U. In this case, if the user U faces a point indicated by the display position information of the product A, the display data related to the product A is displayed in the field of vision of the user U. If the user U then moves, and the distance between the user U and the point A becomes not less than 20 m, the server 110 notifies the wearable terminal 130A that display of the display data related to the product A is to be ceased. In this state, if the user U faces the point indicated by the display position information of the product A, the display data related to the product A is not displayed in the field of vision of the user U.

Figure 11:
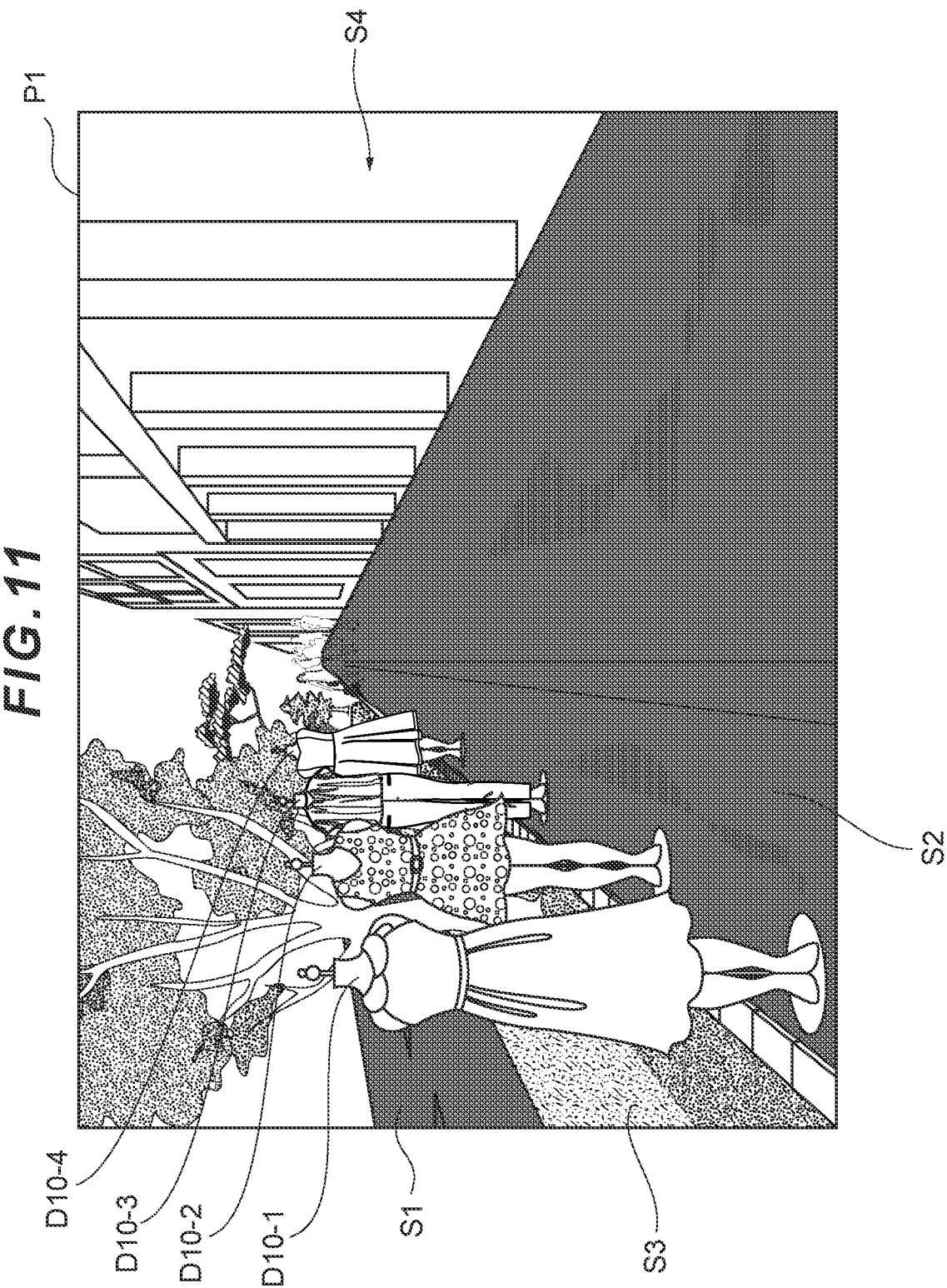
FIG. 11 is a view showing an example at the time of display of display data related to a product.

FIG. 11 is a view showing an example at the time of display of display data related to a product. In FIG. 11, a region S1 is a street, a region S2 is a sidewalk, a region S3 is a planted zone, and a region S4 is a building. Assume that the region S2 is a safe region and that display data received from the server 110 by the wearable terminal 130A includes four pieces of 3D model data D10-1 to D10-4.

The acquisition unit 136 of the wearable terminal 130A acquires a range of the region S2 that is a safe region from an image P1 which is taken by the image pickup unit 134. The output unit 137 superimposes and displays the four pieces of 3D model data D10-1 to D10-4 in the acquired region S2. At this time, the output unit 137 stores positions of first-time display of the pieces of 3D model data D10-1 to D10-4 and controls the display positions so as to prevent the display positions of the pieces of 3D model data D10-1 to D10-4 from changing even if the orientation or the current position of the wearable terminal 130A changes (i.e., an orientation of a face changes or the user U moves). For example, if the user U turns around in the state shown in FIG. 11, the pieces of 3D model data D10-1 to D10-4 disappear from the field of vision. For example, if the user U moves straight toward the back of the image P1, the 3D models disappear from the field of vision in the order of the piece of 3D model data D10-1, the piece of 3D model data D10-2, the piece of 3D model data D10-3, the piece of 3D model data D10-4.

When the user approaches particular display data by moving, the output unit 137 outputs attribute data related to a product for the display data. For example, if the user U approaches the product D10-4 with interest, attribute data including a product name, a price, and the like is displayed around the 3D model of the product D10-4.

The acceptance unit 138 of the wearable terminal 130A detects that the user U has been facing a particular product for a predetermined time period, using a gaze detection sensor, detects that the user U has designated the particular product by operating a wearable device, such as a smart ring, or detects that the user has designated the particular product by voice using voice recognition technology, thereby accepting selection of the product. Information indicating the product accepted by the acceptance unit 138 may be transmitted to the server 110, and the product may be registered in the server 110 as a favorite product of the user U or a process of purchasing the product may be executed.

Although the output unit 137 arranges pieces of display data related to a plurality of products at a left end of the region S2 in the example in FIG. 11, the present disclosure is not limited to this. The output unit 137 may arrange pieces of display data related to products at predetermined intervals in a lateral direction of the region S2 or may arrange the pieces of display data side by side at a right end of the region S2.

(Display of Product (II))

Display of Product (II) is based on the assumption that the user U utilizes pedestrian navigation, and display data related to a product is displayed along a route to a destination.

Figure 12:
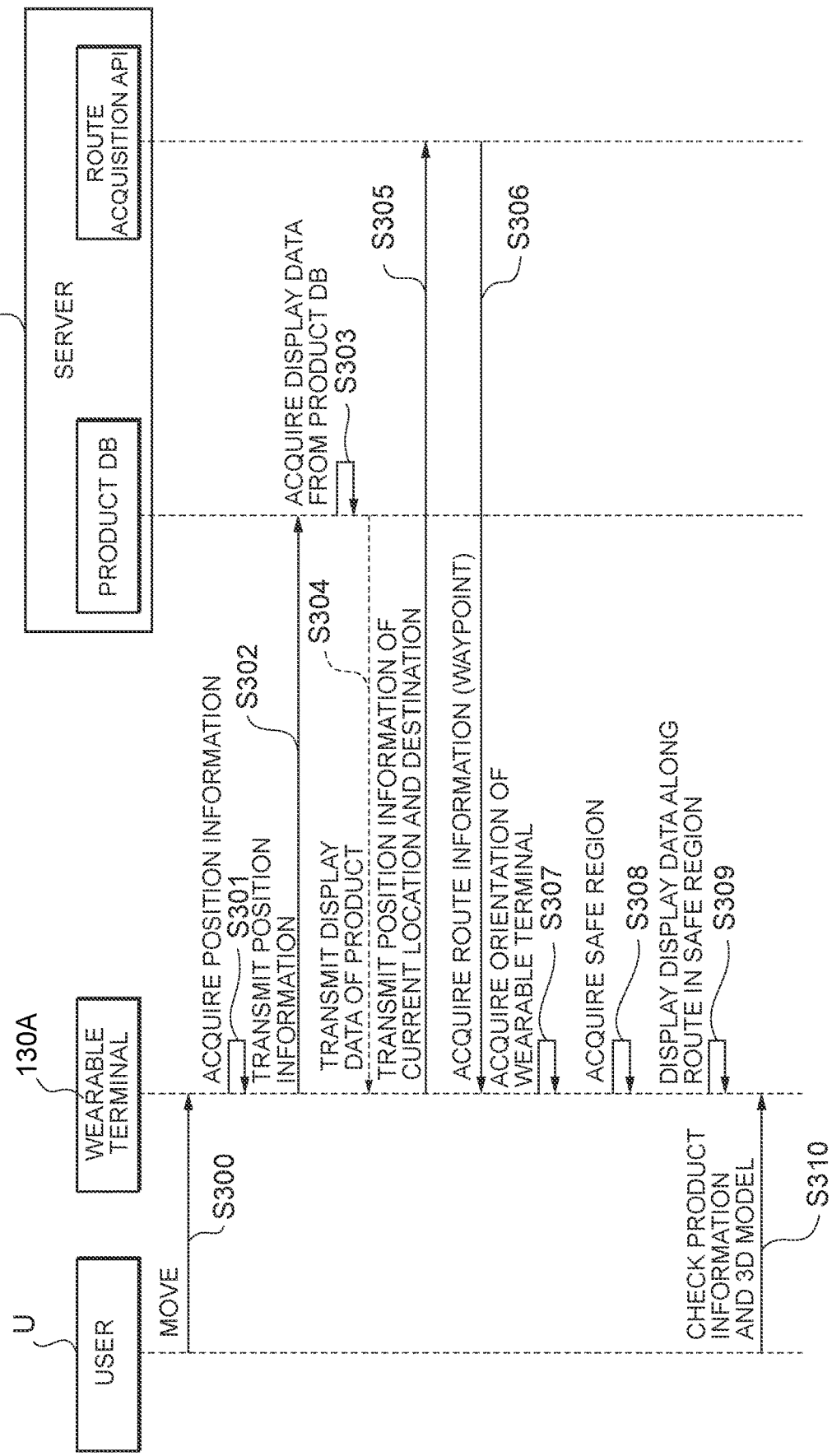
FIG. 12 is a sequence chart showing an example (II) of the procedures at the time of display of a product in the field of vision of the user.

FIG. 12 is a sequence chart showing an example (II) of the procedures at the time of display of a product in the field of vision of the user.

Steps S300 to S304 are the same as the procedures in steps S200 to S204, respectively, in FIG. 10, and a description thereof will be omitted.

In step S305, the transmission unit 132 of the wearable terminal 130A transmits the current position of the wearable terminal 130A and a destination desired by the user U to the server 110.

In step S306, the pathway acquisition unit 117 of the server 110 acquires a pathway (route) from the current position to the destination by making a search of map data or the like. The transmission unit 116 of the server 110 transmits pathway data indicating the acquired pathway to the wearable terminal 130A. The pathway data may be data which expresses a pathway by arranging, side by side, a plurality of positions (waypoints) which are each indicated by a latitude and a longitude or data which expresses a pathway by combining an identifier of a node (an intersection) and an identifier of a link (a line connecting intersections) which are assigned on a map. In the latter case, the map data may also be stored in the information processing terminal 130 to allow the information processing terminal 130 to recognize line segments indicating a pathway by latitudes and longitudes from identifiers of nodes and identifiers of links.

Steps S307 and S308 are the same as the procedures in steps S205 and S206, respectively, in FIG. 10, and a description thereof will be omitted.

In step S309, the output unit 137 outputs the display data along the pathway indicated by the pathway information that is acquired by the procedure in step S306 and indicates a pathway, by which the user U moves. The output unit 137 may create an image of the pathway to be AR-displayed using the pathway data received in the procedure in step S306 and output the created route together with the display data. For example, the output unit 137 may identify a position where the pathway is to be drawn on the display 1136 by collating the current position of the wearable terminal 130A, the orientation, and/or a camera image with the pathway data and display the image of the pathway at the identified position.

In step S310, the user U can enjoy window-shopping while walking to the destination by visually recognizing a 3D model of a product which is displayed along the pathway.

Figure 13:
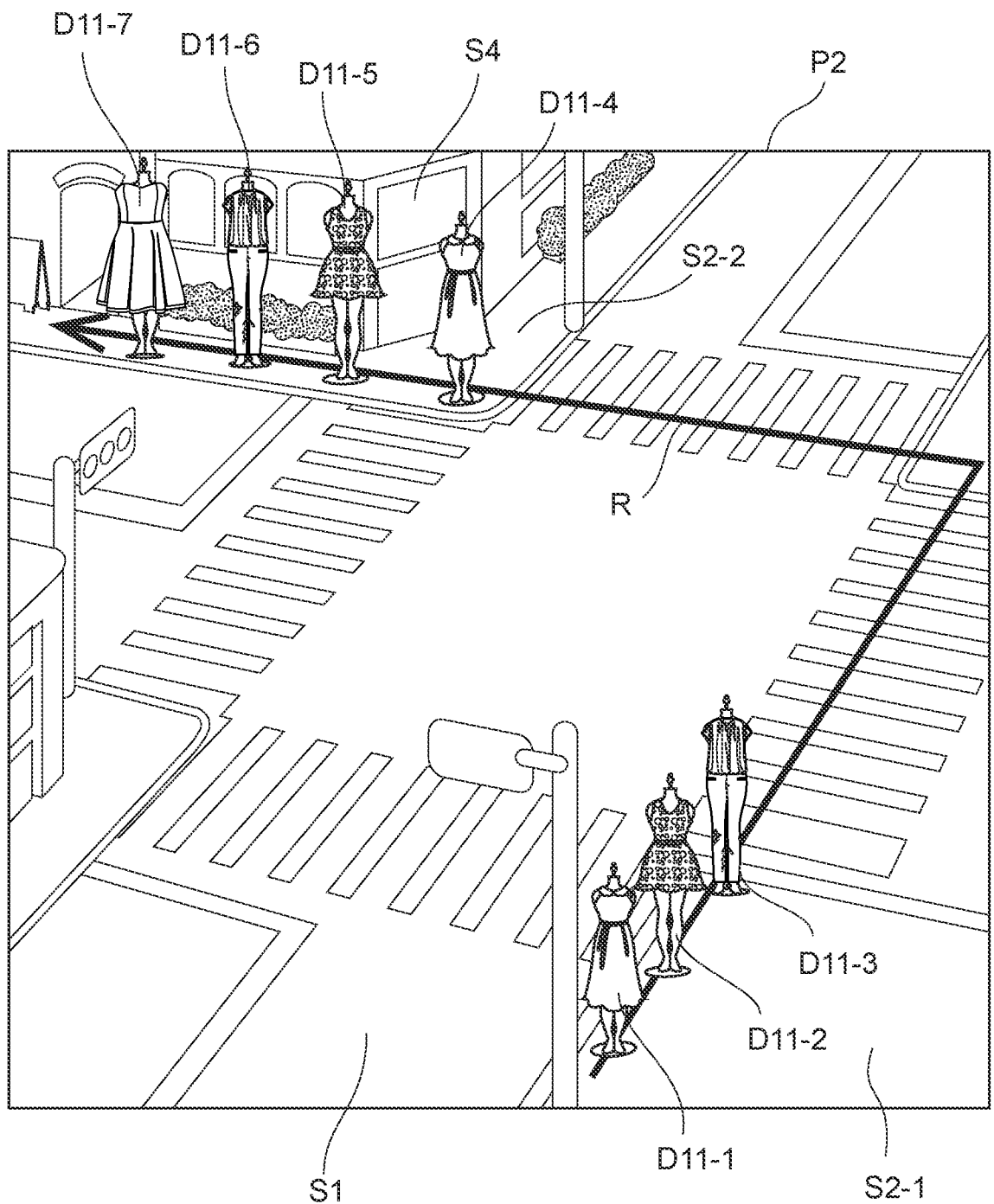
FIG. 13 is a view showing an example at the time of display of display data related to a product along a pathway.

FIG. 13 is a view showing an example at the time of display of display data related to a product along a pathway. In FIG. 13, a region S1 is a street, regions S2-1 and S2-2 are sidewalks, and a region S4 is a building. Assume that the regions S2-1 and S2-2 are safe regions and that display data received from the server 110 by the wearable terminal 130A includes seven pieces of 3D model data D11-1 to D11-7. A pathway R is an image indicating a pathway from a current location to a destination. Note that although an image P2 is shown from a viewpoint above a viewpoint of the user U for explanatory convenience, the field of vision visually recognized by the user U through the wearable terminal 130A is at a position close to a road surface, as in FIG. 11 described earlier. The image indicating the pathway may be a line segment, a dotted line, or an arrow indicating a traveling direction of the user U.

The acquisition unit 136 of the wearable terminal 130A acquires ranges of the regions S2-1 and S2-2 that are safe regions from the image P2 that is taken by the image pickup unit 134, and the output unit 137 superimposes and displays the seven pieces of 3D model data D11-1 to D11-7 in the acquired regions S2-1 and S2-2. At this time, the output unit 137 stores positions of first-time display of the pieces of 3D model data D11-1 to D11-7 and controls the display positions so as to prevent the display positions of the pieces of 3D model data D11-1 to D11-7 from changing even if the orientation or the current position of the wearable terminal 130A changes (i.e., the orientation of the face of the user U changes or the user U moves). For example, if the user U turns around in the state shown in FIG. 12, the pieces of 3D model data D11-1 to D11-7 disappear from the field of vision. When the user U moves along the pathway R, the pieces of 3D model data D11-1 to D11-3 disappear in the order of the piece of 3D model data D11-1, the piece of 3D model data D11-2, the piece of 3D model data D11-3. When the user crosses an intersection and turns left to go left, the pieces of 3D model data D11-5 to D11-7 are displayed at the front of the field of vision of the user.

(Communication Between User U and Manager of Product)

The present embodiment may allow direct communication between a manager of a product and the user U.

Figure 14:
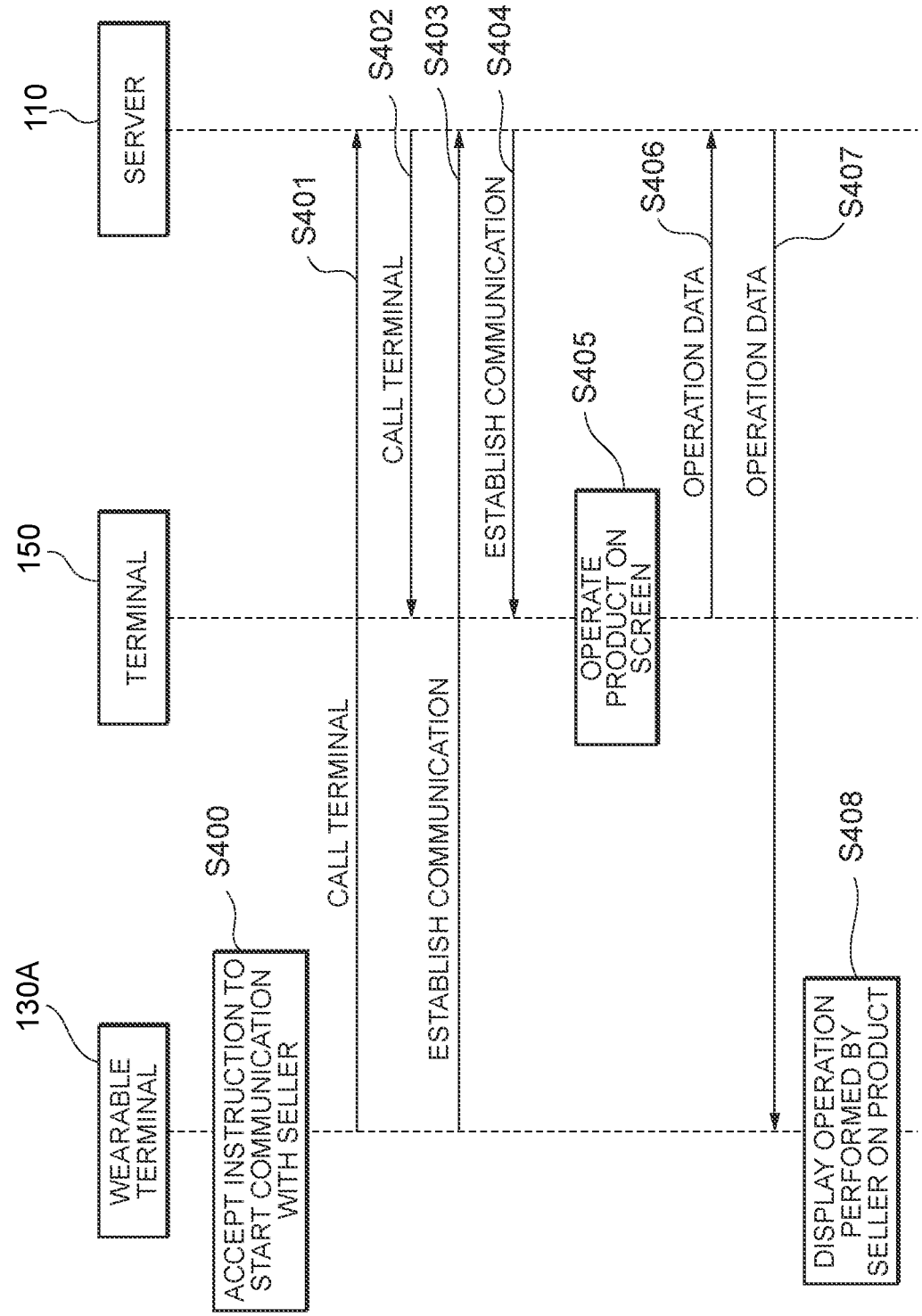
FIG. 14 is a sequence chart showing an example of procedures at the time of communication between the user and a seller.

FIG. 14 is a sequence chart showing an example of procedures at the time of communication between a user and a seller.

In step S400, the acceptance unit 138 of the wearable terminal 130A accepts an instruction from the user U for communication with the manager about a particular product (hereinafter referred to as a product A). For example, if the acceptance unit 138 detects that the user U has made a particular gesture while facing the product A, the acceptance unit 138 may recognize that the user U is giving an instruction for communication with the manager of the product A.

In step S401, the transmission unit 132 acquires information (e.g., a phone number, an e-mail address, or a predetermined ID) which is included in a manager ID of the product A in the product DB and by which the terminal 150 can be called and transmits a message which calls the terminal 150 corresponding to the manager ID to the server 110.

In step S402, the server 110 calls the terminal 150.

In steps S403 and S404, a communication pathway is established between the wearable terminal 130A and the terminal 150 via the server 110. In this state, a conversation between the wearable terminal 130A and the terminal 150 by means of voice or moving images is possible. That is, a world which the user U views via the wearable terminal 130A is like a roadside stand, and the manager (seller) can make a conversation, such as accepting a question or explaining details of the product, with the user U (buyer) during standby.

Note that, at the time of conversation by means of moving images, a moving image which is obtained by taking an image of the manager with the image pickup unit 153 of the terminal 150 may be output as a 2D image adjacent to display data of the product A that is output to the wearable terminal 130A.

In step S405, the manager of the product makes a predetermined drawing on an image of the product A by performing an operation on the image of the product A that is displayed on the display of the terminal 150.

In steps S406 and S407, operation data indicating what is drawn on the image of the product A is transmitted to the wearable terminal 130A via the server 110.

In step S408, the output unit 137 of the wearable terminal 130A draws the same as what is drawn on the image of the product A on the display data of the product A on the display of the terminal 150.

Figure 15:
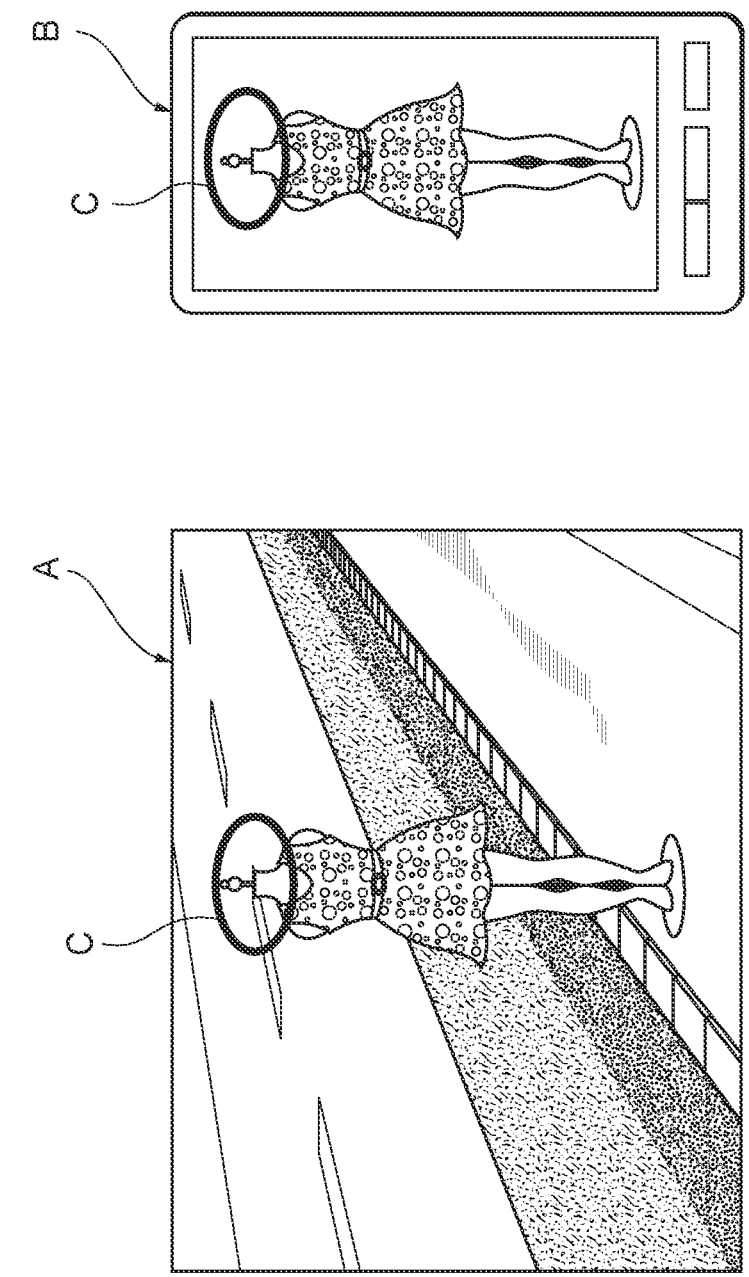
FIG. 15 are views showing an example of a communication method to be performed between the user and a manager of a product.

FIG. 15 are views showing an example of a communication method to be performed between the user U and the manager of the product. FIG. 15A shows display data of the product A which is recognized via the wearable terminal 130A by the user U, and FIG. 15B shows a display example of a screen of the terminal 150 that the manager of the product A utilizes.

For example, if the manager encloses a neck portion of the product A with a circle C, as shown in FIG. 15B, the circle C is also superimposed and displayed on 3D model data of the product A which is being viewed by the user U, as shown in FIG. 15A.

For the above-described reason, the manager can give an explanation while superimposing and displaying drawings, such as a line and a circle, on the product A in addition to voice or the like, i.e., sharing marks, such as a line and a circle, between the manager (seller) and the user U (purchaser) at the time of explanation of the product A to the user U.

Figure 16:
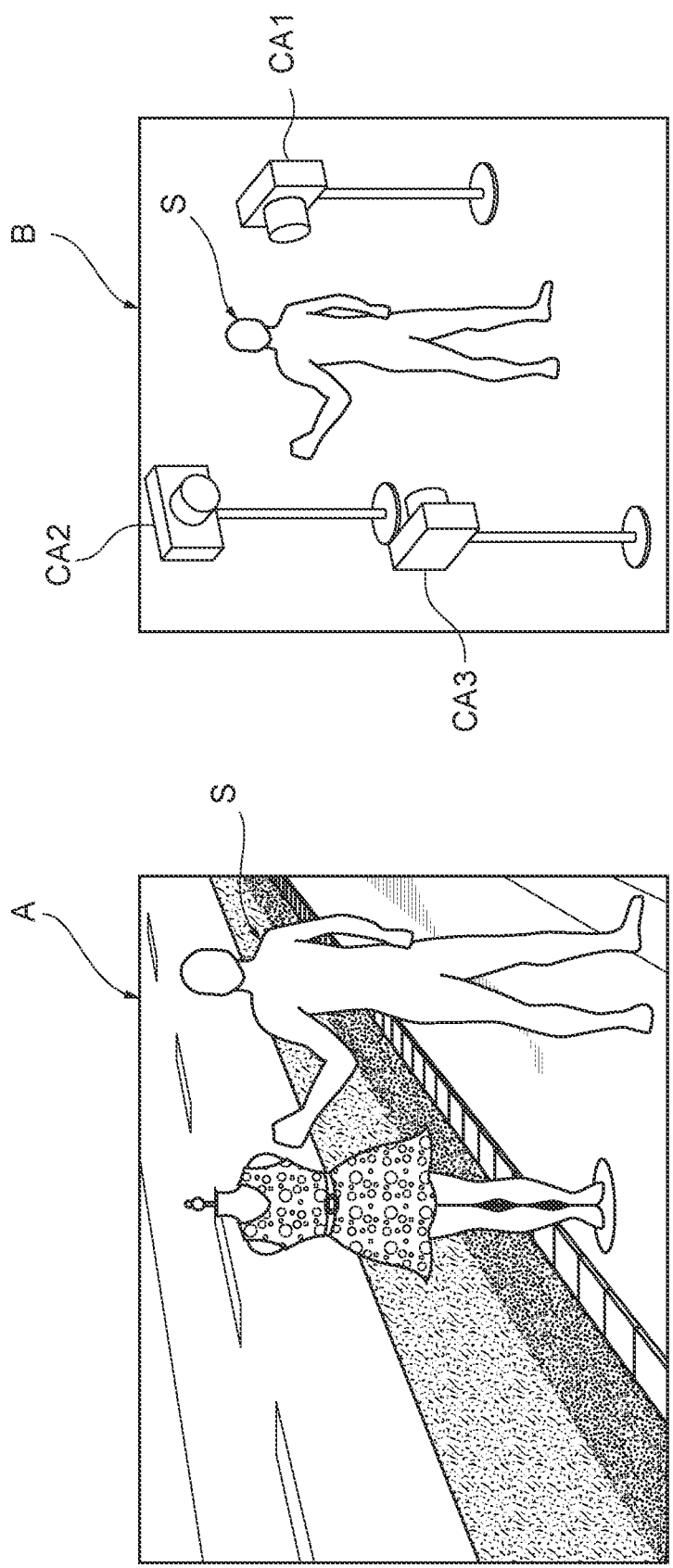
FIG. 16 are views showing an example of the communication method to be performed between the user and the manager of the product.

Note that, as shown in FIG. 16, 3D model data (real-time 3D captured data) S of the manager itself may be displayed adjacent to 3D model data of the product A which is being visually recognized via the wearable terminal 130A by the user U by transmitting in real time the 3D model data of the manager from the terminal 150 to the wearable terminal 130A via the server 110 instead of operation data.

In the above-described case, the terminal 150 may generate the 3D model data S of the manager itself using a plurality of image pickup apparatuses (image pickup apparatuses CA1 to CA3 in the example in FIG. 16A) which are connected to the terminal 150, as shown in FIG. 16A. The transmission unit 151 of the terminal 150 may transmit in real time the generated 3D model data S of the manager to the wearable terminal 130A via the server 110. This makes it possible to display the 3D model data S of the manager of the product A adjacent to the 3D model data of the product A being viewed by the user U, as shown in FIG. 16A. Note that an image which is recognized via the wearable terminal 130A by the user U may be transmitted to the terminal 150. The manager can give an explanation while grasping a position relationship between a position of the product A and the 3D model data S of itself.

Note that, in the example in FIG. 16, the terminal 150 may track a body of a manger in real time on the basis of images which are picked up by image pickup apparatuses C1 to C3 and detect feature points, such as a nose, an eye, an ear, a neck, a shoulder, an elbow, a wrist, a waist, a knee, and an ankle, of the manager using an existing human pose estimation technique. Note that, if the image pickup apparatuses C1 to C3 each have an infrared depth sensor, the image pickup apparatus may detect a feature point by calculating the depth of an infrared ray. A method for storing feature points of a human body detected by human pose estimation may be two-dimensional or three-dimensional. The terminal 150 generates the 3D model data S of the manager of the product A on the basis of the detected feature points of the manager and transmits in real time the 3D model data S to the wearable terminal 130A.

With the above-described configuration, the manager (seller) can display a real-time 3D captured image of itself in front of the user U's eyes and tell features of a product to the user U by making full use of, e.g., voice, characters, and a gesture using a hand or the like which is displayed in real time. Note that the manager (seller) may give an explanation of a product by displaying not only a real-time 3D captured image of itself but also a 2D or 3D avatar in front of the user U. In this case, the motion of the avatar can be synchronized with the motion of the manager (seller) through motion capture of, e.g., an optical type, a mechanical type, an inertial sensor type, a magnetic type, or a video type.

Figure 17:
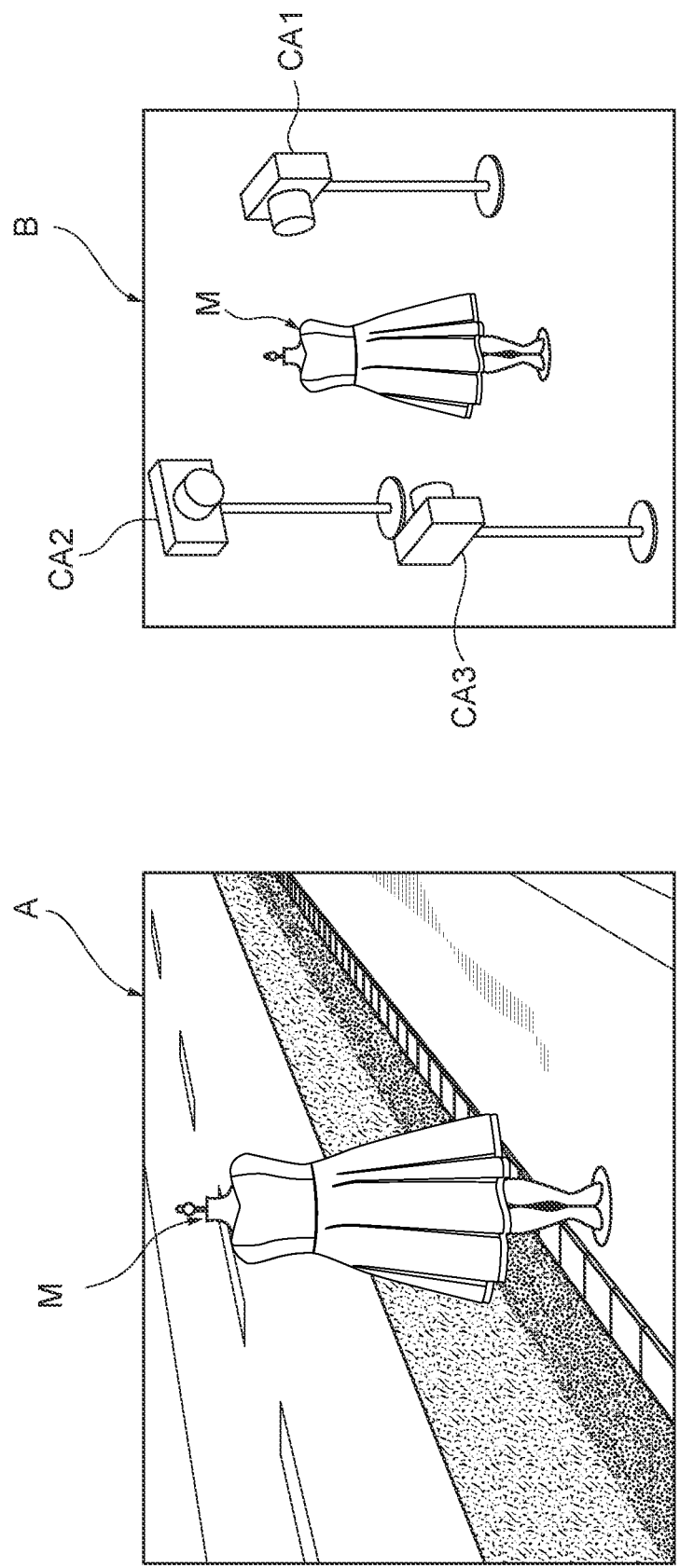
FIG. 17 are views showing an example of the communication method to be performed between the user and the manager of the product.

As shown in FIG. 17, the manager may display in real time 3D model data of the product A which is obtained through image-taking by the manager using the terminal 150 as 3D model data of the product A which is being visually recognized via the wearable terminal 130A by the user U by transmitting in real time display data of the product A from the terminal 150 to the wearable terminal 130A via the server 110 instead of operation data.

In the above-described case, when the manager puts a skirt on a torso M, as shown in FIG. 17B, the terminal 150 may generate 3D model data of the torso M with the skirt on using a plurality of image pickup apparatuses (the image pickup apparatuses CA1 to CA3 in the example in FIG. 17B) which are connected to the terminal 150. The transmission unit 151 of the terminal 150 may transmit in real time the generated 3D model data of the torso to the wearable terminal 130A via the server 110. This makes it possible to display a 3D model of the torso M with the skirt on, as shown in FIG. 17A.

For the above-described reason, the manager can perform, e.g., proposal of various outfits to the user U in real time and remotely.

<Modification>

The information processing terminal 130 and the terminal 150 may accept in advance setting of a region where 3D model display is to be inhibited from the user U or a manager of a product. In this case, the information processing terminal 130 may switch between 3D model display and non-display on the basis of, for example, position information of itself and settings on a place where 3D model output is to be inhibited. The information processing terminal 130 may switch between 3D model display and non-display in accordance with a movement speed (whether movement on foot or movement on board). The movement speed may be measured by utilizing GPS or VPS. For example, if the position acquisition unit 131 detects that the movement speed of the information processing terminal 130 is not less than a fixed speed, the output unit 137 may determine that the user U is moving on board and not output a 3D model.

If display data related to a product is suitable for display on a wall surface (e.g., in the case of a painting), the information processing terminal 130 may output the display data such that the product is displayed on the wall surface. If display data related to a product is suitable for display on a desk (e.g., in the case of a vase), the display data may be output such that the product is displayed on the desk. Information indicating an attribute of a place which is suitable for display of display data related to each product may be registered in advance in a product DB, and the server 110 may transmit the information indicating the attribute to the information processing terminal 130 together with the display data at the time of transmission of the display data to the information processing terminal 130.

In the present embodiment, information to be displayed may be changed in accordance with the behavior (action) of a user. For example, the information processing terminal 130 may generate a heat map indicating a spot where the user's gaze is focused by acquiring the user's gaze and notify the server 110. For example, if the user's gaze is focused on a particular product among a plurality of products, the server 110 can estimate that the user U is interested in the particular product. The server 110 may estimate the taste of the user by analyzing a trend for products which the user U is interested in (a trend for products which the user's gaze is focused on) or a trend for products (products marked as favorites) which are selected by the user U.

In the above-described case, the identification unit 115 of the server 110 may select (identify) a product, of which the information processing terminal 130 is to be notified, on the basis of the estimated taste of the user and transmit display data related to the selected product to the information processing terminal 130. Alternatively, the identification unit 115 may search for one or more products corresponding to position information of the information processing terminal 130 in the product DB, further select display data related to a product which suits the taste of the user U from among the one or more products retrieved, and transmit the display data to the information processing terminal 130. That is, the server 110 may transmit display data related to a product to be recommended to the user U to the information processing terminal 130. The product to be recommended may be changed with each day, may be a new product, or may be a popular product. Even if the user U passes through the same place every day, products to be displayed in the field of the user change. This allows the user U to be kept from being bored.

The server 110 may transmit display data related to a product which the user U is estimated to be interested in to the information processing terminal 130 with predetermined frequency, regardless of display position information for the product. A product which the user U is interested in can be frequently displayed in the field of vision of the user U.

The information processing terminal 130 may include a device which expands a sense of touch, a sense of smell, a sense of taste and/or a sense of hearing of the user U to make the user U capable of recognizing a touch, a smell, a taste, and/or a sound which is related to a product, in addition to or instead of recognizing a shape of the product through a 3D model. In this case, the server 110 may transmit data related to a touch, a smell, a taste, and/or a sound of a product to the information processing terminal 130.

The information processing terminal 130 may output a 2D model or a 3D model on a reduced scale or an enlarged scale at the time of output. For example, display of a large 3D model in, e.g., a narrow corridor indoors is not preferable because the field of vision of the user U is obstructed. In such a case, a 2D model or a 3D model may be output on a reduced scale under normal conditions, and the model is enlarged to, e.g., full scale if the user U approaches or an instruction from the user U is accepted. To display, e.g., characters in a name of a product, a price of the product, and the like, a part of the character string may be omitted or display of the characters may be omitted under normal conditions, and the character string may be output without omission if the user U approaches or an instruction from the user U is accepted. This makes it possible to present many pieces of information to the user U without impairing the field of vision of the user U.

CONCLUSION

The above-described embodiment makes it possible to offer an experience in safely conducting electronic commerce, such as online shopping, even during movement.

The above embodiment is intended to facilitate understanding of the present invention and is not intended to interpret the present invention in a limited manner. The flowcharts and sequences described in the embodiment, the elements included in the embodiment, arrangement, materials, conditions, shapes, sizes, and the like of the elements are not limited to those illustrated and can be appropriately changed. Components shown in different embodiments can be partially replaced or combined with each other.

REFERENCE SIGNS LIST 1 communication system
11 CPU
12 storage device
13 communication IF
14 input device
15 output device
16 sensor
110 server
111 storage unit
112 generation unit
113 registration unit
114 reception unit
115 identification unit
116 transmission unit
117 pathway acquisition unit
130 information processing terminal
130A terminal
130A wearable terminal
130B terminal
131 position acquisition unit
132 transmission unit
133 reception unit
134 image pickup unit
135 identification unit
136 acquisition unit
137 output unit
138 acceptance unit
150 terminal
151 transmission unit
152 reception unit
153 image pickup unit
154 position acquisition unit
155 display unit
156 generation processing unit
1136 display
1137 frame
1138 hinge unit
1139 temple
1139a locking portion
1210 image pickup unit

What is claimed is:

1. A computer-readable non-transitory storage medium storing a program for causing an information processing device utilized by a user to execute:
    a step of acquiring position information indicating a position of the information processing device;
    a step of transmitting the position information to an information processing apparatus;
    a step of receiving display data related to one or more products which is associated with the position information from the information processing apparatus;
    a step of receiving 3D model data of a seller of a first product of the one or more products, the 3D model data generated by capturing an image of the seller;
    a step of acquiring a first region where the user can safely walk, the first region being a region in an image taken by an image pickup unit;
    a step of acquiring a second region where the user may be exposed to danger if the user were to linger, the second region identified from the image taken by the image pickup unit; and
    a step of outputting the display data related to the one or more products to a position overlapping with the first region and not overlapping with the second region in: (i) a real space corresponding to the image, or (ii) the image;
    wherein the step of outputting comprises outputting a 3D model of the seller using the received 3D model data, the 3D model of the seller displayed in association with display data related to the first product of the one or more products.

2. The computer-readable non-transitory storage medium according to claim 1, wherein
    the step of outputting comprises outputting the display data related to the one or more products such that the display data is arranged on a boundary of the first region.

3. The computer-readable non-transitory storage medium according to claim 1, wherein
    the program causes the information processing device to further execute:
    a step of accepting selection of the one or more products from the user; and
    a step of transmitting information for identification of an accepted product to the information processing apparatus.

4. The computer-readable non-transitory storage medium according to claim 1, wherein
the program causes the information processing device to further execute a step of acquiring pathway information indicating a pathway, by which the user moves, from the information processing apparatus or a different information processing apparatus, and
the step of outputting comprises outputting the product data related to the one or more products along the pathway indicated by the pathway information.

5. The computer-readable non-transitory storage medium according to claim 1, wherein
the step of receiving comprises further receiving attribute data of the one or more products from the information processing apparatus, and
the step of outputting comprises outputting attribute data of a product corresponding to first display data included in the display data of the one or more products when the information processing device moves in a direction toward the first display data.

6. The computer-readable non-transitory storage medium according to claim 1, wherein
the display data includes at least one of image data of a product, three-dimensional model data of the product, and discount information of the product.

7. An information processing device utilized by a user, comprising:
one or more processors;
a storage device communicatively coupled to the one or more processors; and
one or more programs stored in the storage device and configured for execution by the one or more processors, the one or more programs comprising instructions for:
acquiring position information indicating a position of the information processing device;
transmitting the position information to an information processing apparatus;
receiving display data related to one or more products which is associated with the position information from the information processing apparatus;
receiving 3D model data of a seller of a first product of the one or more products, the 3D model data generated by capturing an image of the seller;
acquiring a first region where the user can safely walk, the first region being a region in an image taken by an image pickup unit;
acquiring a second region where the user may be exposed to danger if the user were to linger, the second region identified from the image taken by the image pickup unit;
outputting the display data related to the one or more products to a position overlapping with the first region and not overlapping with the second region in: (i) a real space corresponding to the image, or (ii) the image; and
outputting a 3D model of the seller using the received 3D model data, the 3D model of the seller displayed in association with display data related to the first product of the one or more products.

8. The information processing device of claim 7, wherein the first region where the user can safely walk comprises a sidewalk, and wherein the display data related to the one or more product is to be displayed along an edge of the sidewalk.

9. The information processing device of claim 7, wherein the one or more programs further comprise instructions for:
after outputting the display data, receiving an indication from the user that a product of the one or more products is of interest to the user; and
marking the product as a favorite of the user.

10. The information processing device of claim 7, wherein the information processing device comprises artificial reality (AR) glasses.

11. The information processing device of claim 7, wherein the one or more programs further comprise instructions for, prior to acquiring the first region, transmitting a destination of the user to the information processing apparatus, wherein the first region is based on the position of the information processing device and the destination of the user.

12. The information processing device of claim 7, wherein the outputting comprises outputting the display data related to the one or more products such that the display data is arranged on a boundary of the first region.

13. The information processing device of claim 7, wherein the one or more programs further comprise instructions for:
accepting selection of the one or more products from the user; and
transmitting information for identification of an accepted product to the information processing apparatus.

14. The information processing device of claim 7, wherein the one or more programs further comprise instructions for:
acquiring pathway information indicating a pathway, by which the user moves, from the information processing apparatus or a different information processing apparatus, and
the step of outputting comprises outputting the product data related to the one or more products along the pathway indicated by the pathway information.

15. The information processing device of claim 7, wherein:
the receiving comprises further receiving attribute data of the one or more products from the information processing apparatus, and
the outputting comprises outputting attribute data of a product corresponding to first display data included in the display data of the one or more products when the information processing device moves in a direction toward the first display data.

16. The information processing device of claim 7, wherein the display data includes at least one of image data of a product, three-dimensional model data of the product, and discount information of the product.

17. The information processing device of claim 7, wherein the second region corresponds to a crosswalk, a railroad crossing, or an area having an associated warning sign.

18. A computer-readable non-transitory storage medium storing a program for causing an information processing apparatus to execute:
a step of receiving position information indicating a position of an information processing device utilized by a user from the information processing device;
a step of identifying, from among one or more pieces of display data related respectively to one or more products which are stored in a storage device and with which one or more pieces of display position information are correlated, the piece of display data related to one or more products that is correlated with the piece of display position information indicating a position within a predetermined distance from a position indicated by the position information;

a step of transmitting, to the information processing device, the piece of display data related to the one or more products that is to be displayed in a position overlapping with a first region where the user can safely walk and not overlapping with a second region where the user may be exposed to danger if the user were to linger, the first region and the second region identified from an image taken by an image pickup unit; and a step of transmitting, to the information processing device, model data to construct a 3D model of a seller of a first product of the one or more products, the model data generated by capturing an image of the seller, wherein the 3D model of the seller is to be displayed in association with display data related to the first product.

19. The computer-readable non-transitory storage medium of claim 18, wherein the first region where the user can safely walk comprises a sidewalk, and wherein the piece of display data related to the one or more product is to be displayed along an edge of the sidewalk.

20. The computer-readable non-transitory storage medium of claim 18, wherein the piece of display data includes at least one of image data of a product, three-dimensional model data of the product, and discount information of the product.

* * * * *